United States Patent
Furumoto et al.

(10) Patent No.: US 9,864,577 B2
(45) Date of Patent: *Jan. 9, 2018

(54) VOICE RECOGNITION DEVICE AND DISPLAY METHOD

(71) Applicant: Mitsubishi Electric Corporation, Tokyo (JP)

(72) Inventors: Yuki Furumoto, Tokyo (JP); Hiroki Sakashita, Tokyo (JP); Masanobu Osawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 164 days.

This patent is subject to a terminal disclaimer.

(21) Appl. No.: 14/648,971

(22) PCT Filed: Feb. 18, 2014

(86) PCT No.: PCT/JP2014/053768
§ 371 (c)(1),
(2) Date: Jun. 2, 2015

(87) PCT Pub. No.: WO2015/125212
PCT Pub. Date: Aug. 27, 2015

(65) Prior Publication Data
US 2016/0011854 A1    Jan. 14, 2016

(51) Int. Cl.
*G10L 21/00* (2013.01)
*G06F 3/16* (2006.01)
(Continued)

(52) U.S. Cl.
CPC ......... *G06F 3/167* (2013.01); *G01C 21/3608* (2013.01); *G10L 15/22* (2013.01); *G10L 2015/221* (2013.01); *G10L 2015/223* (2013.01)

(58) Field of Classification Search
None
See application file for complete search history.

(56) References Cited

U.S. PATENT DOCUMENTS

| 2010/0106399 A1 | 4/2010 | Waeller et al. |
| 2010/0114480 A1* | 5/2010 | Sugiyama .......... G01O 21/3673 701/408 |

(Continued)

FOREIGN PATENT DOCUMENTS

| JP | 9-243381 A | 9/1997 |
| JP | 11-3032 A | 1/1999 |

(Continued)

OTHER PUBLICATIONS

Machine translation of JP-2008-14818-A published Jan. 24, 2008.

*Primary Examiner* — Richa Mishra
(74) *Attorney, Agent, or Firm* — Birch, Stewart, Kolasch & Birch, LLP

(57) ABSTRACT

Because a voice recognition device in accordance with the present invention can change the position where or the display form in which a display item corresponding to a voice recognition result is displayed according to the degree of importance of a display area in which the display item is displayed when recognizing a voice uttered by the user, the voice recognition device can prevent the acquisition of other information important for the user from being blocked due to the display of the display item, and improve the user's convenience.

21 Claims, 21 Drawing Sheets

(51) Int. Cl.
*G01C 21/36* (2006.01)
*G10L 15/22* (2006.01)

(56) References Cited

U.S. PATENT DOCUMENTS

| | | | |
|---|---|---|---|
| 2010/0198093 A1* | 8/2010 | Katayama | G10L 15/22 600/519 |
| 2011/0283226 A1 | 11/2011 | Basson et al. | |
| 2015/0113483 A1* | 4/2015 | Van Der Westhuizen | G06F 3/04812 715/850 |

FOREIGN PATENT DOCUMENTS

| | | |
|---|---|---|
| JP | 2006-178898 A | 7/2006 |
| JP | 2008-4818 A | 1/2008 |
| JP | 2008-14818 A | 1/2008 |
| JP | 2013-231660 A | 11/2013 |
| JP | 2013231660 A * | 11/2013 |

* cited by examiner

FIG.4

| Item | Degree of Importance |
|---|---|
| Information in Traveling Direction or Planned Traveling Direction of Vehicle | 20 |

(a)

| Item | Degree of Importance |
|---|---|
| Congestion Information Is Displayed in Display Area in Traveling Direction or Planned Traveling Direction of Vehicle | 25 |
| Construction Information Is Displayed in Display Area in Traveling Direction or Planned Traveling Direction of Vehicle | 25 |
| Accident Information Is Displayed in Display Area in Traveling Direction or Planned Traveling Direction of Vehicle | 25 |

(b)

| Number of Facility Icons | Degree of Importance |
|---|---|
| 0 | 0 |
| 1 | 10 |
| 2 | 20 |
| 3 | 30 |
| ⋮ | ⋮ |

FIG.7

| Item | Degree of Importance |
|---|---|
| Traveling along Highway | 5 |
| Travelling along Local Road | 10 |
| Traveling through Tunnel | 5 |

FIG.8

| Item | Degree of Importance |
|---|---|
| Traveling in Urban Area | 15 |
| Travelling in Suburban Area | 10 |
| Traveling in Mountains | 5 |
| Traveling on Sea | 5 |

FIG.9

| Graphical Scale | Degree of Importance |
|---|---|
| 25m | 25 |
| 50m | 20 |
| 100m | 15 |
| 200m | 10 |
| 500m | 5 |
| 1km | 0 |
| 3km | 0 |
| 5km | 0 |

FIG.11

| Item | Degree of Importance |
|---|---|
| Displaying Intersection Guidance Information | 60 |
| Displaying Pedestrian Information | 70 |
| Displaying Oncoming Vehicle Information | 70 |
| Displaying Disaster Information | 70 |

FIG.12

| Item | Degree of Importance |
|---|---|
| Traveling Speed of Vehicle Is Equal or Higher Than Predetermined Speed | 20 |
| Vehicle Is Accelerating | 25 |
| Vehicle Is Blinking Either Right Turn Signal or Left Turn Signal | 25 |

FIG.13

| Item | Degree of Importance |
|---|---|
| Current Time When Vehicle Is Travelling Falls Between 19:00 and 6:00 | 10 |
| Illumination in Surroundings of Vehicle Is Equal to or Less Than Predetermined Threshold | 10 |
| Weather in Surroundings of Vehicle Is Rain or Snow | 20 |
| Congestion Has Occurred in Surroundings of Vehicle | 25 |

FIG.14

| Item | | Degree of Importance |
|---|---|---|
| Contents of Display Item | Display Screen | |
| Word about Music | Playback Screen of Music | 0 |
| Word about Music | Map Screen | 10 |
| Word about Facility | Playback Screen of Music | 10 |
| Word about Facility | Map Screen | 0 |

| Display Mode | Degree of Importance |
|---|---|
| Single-Screen Display | 0 |
| Two-Screen Display | 10 |
| 3D Display | 10 |
| Display at Daytime | 0 |
| Display at Nighttime | 10 |

(a)                    (b)

VOICE RECOGNITION DEVICE AND DISPLAY METHOD

FIELD OF THE INVENTION

The present invention relates to a voice recognition device that recognizes a voice uttered by a user and displays a display item corresponding to a recognition result, and a display method of causing a display device to display the display item.

BACKGROUND OF THE INVENTION

Conventionally, as a voice recognition method, a method of recognizing a voice uttered by a user and displaying a result of the recognition has been known.

For example, patent reference 1 discloses a voice recognition device that recognizes a voice uttered by a user and displays a result of the recognition, and when the user utters, displays a shortcut button which is a recognition result of the voice on a display screen, and performs a shortcut function when the user presses the shortcut button.

RELATED ART DOCUMENT

Patent Reference

Patent reference 1: Japanese Unexamined Patent Application Publication No. 2008-14818

SUMMARY OF THE INVENTION

Problems to be Solved by the Invention

However, a problem with such a conventional voice recognition device as disclosed in, for example, patent reference 1 is that because the display position of a display item which is generated on the basis of a recognition result is not taken into consideration, the display item is displayed while being superimposed on information, on a map, which is important for the user, and the user is therefore blocked from acquiring the important information.

The present invention is made in order to solve the above-mentioned problem, and it is therefore an object of the present invention to provide a voice recognition device that displays a display item corresponding to a voice recognition result while changing the display position and the display form of the display item according to the degree of importance of an area in which the display item is displayed, and a display method of causing a display device to display the display item.

Means for Solving the Problem

In order to achieve the above-mentioned object, in accordance with the present invention, there is provided a voice recognition device that recognizes a voice uttered by a user, and displays an operation button to which a function corresponding to a recognition result is assigned, the voice recognition device including: a voice acquirer to detect and acquire a voice uttered by the user; a voice recognizer to recognize voice data acquired by the voice acquirer and output a recognition result; a display item generator to generate an operation button corresponding to the recognition result outputted by the voice recognizer; a display having a plurality of display areas; a display area degree of importance calculator to calculate the degree of importance of each of the plurality of display areas in the display; a display item display form determinator to determine at least one of a display area in which the operation button generated by the display item generator is to be displayed and a display form of the operation button on the basis of the degree of importance calculated by the display area degree of importance calculator; and a display item drawer to output a command for displaying the operation button on the basis of the display area or the display form determined by the display item display form determinator to the display, in which when the degree of importance of a display area which is specified in advance from the plurality of display areas is equal to or less than a predetermined threshold, the display item display form determinator determines the display area which is specified in advance as the display area in which the operation button is to be displayed, whereas when the degree of importance of the display area which is specified in advance is greater than the predetermined threshold, determines another display area as the display area in which the operation button is to be displayed.

Advantages of the Invention

Because the voice recognition device in accordance with the present invention can change the display area where or the display form in which an operation button is displayed according to the degree of importance of the display area in which the operation button to which a function corresponding to a voice recognition result is assigned is displayed, the voice recognition device can prevent the acquisition of other information important for the user from being blocked due to the display of the operation button, and improve the user's convenience.

BRIEF DESCRIPTION OF THE FIGURES

FIG. 4 is a table showing an example of a correspondence between information in the traveling direction or a planned traveling direction of the vehicle, and the degree of importance of a display area;

FIG. 7 is a table showing an example of the degree of importance of a display area for each road type;

FIG. 8 is a table showing an example of the degree of importance of a display area for each area type;

FIG. 9 is a table showing an example of the degree of importance of a display area for each graphical scale of a map;

FIG. 11 is a table showing an example of a correspondence between guidance information/warning information and the degree of importance of a display area;

FIG. 12 is a table showing an example of a correspondence between the traveling condition of the vehicle and the degree of importance of a display area;

FIG. 13 is a table showing an example of a correspondence between the surrounding environmental condition of the vehicle and the degree of importance of a display area;

FIG. 14 is a table showing an example of the degree of importance of a display area for a combination of the contents of a display item and a display screen currently being displayed;

EMBODIMENTS OF THE INVENTION

Hereafter, the preferred embodiments of the present invention will be explained in detail with reference to the drawings.

In accordance with the present invention, there is provided a voice recognition device that recognizes a voice uttered by a user, and displays a display item corresponding to a recognition result. A voice recognition process can be performed according to a command for starting the voice recognition process which is provided by the user, or can be a one of recognizing a voice at all times without the command. Although a case of applying the voice recognition device in accordance with the present invention to a navigation device mounted in a moving object, such as a vehicle, will be explained, as an example, in the following embodiments, the voice recognition device can also be applied to a navigation device for other moving objects other than vehicles, and a server for navigation system. Further, the voice recognition device in accordance with the present invention can be applied to an application for navigation system installed in mobile information terminals, such as smart phones, tablet PCs, and mobile phones.

Embodiment 1

Figure 1:
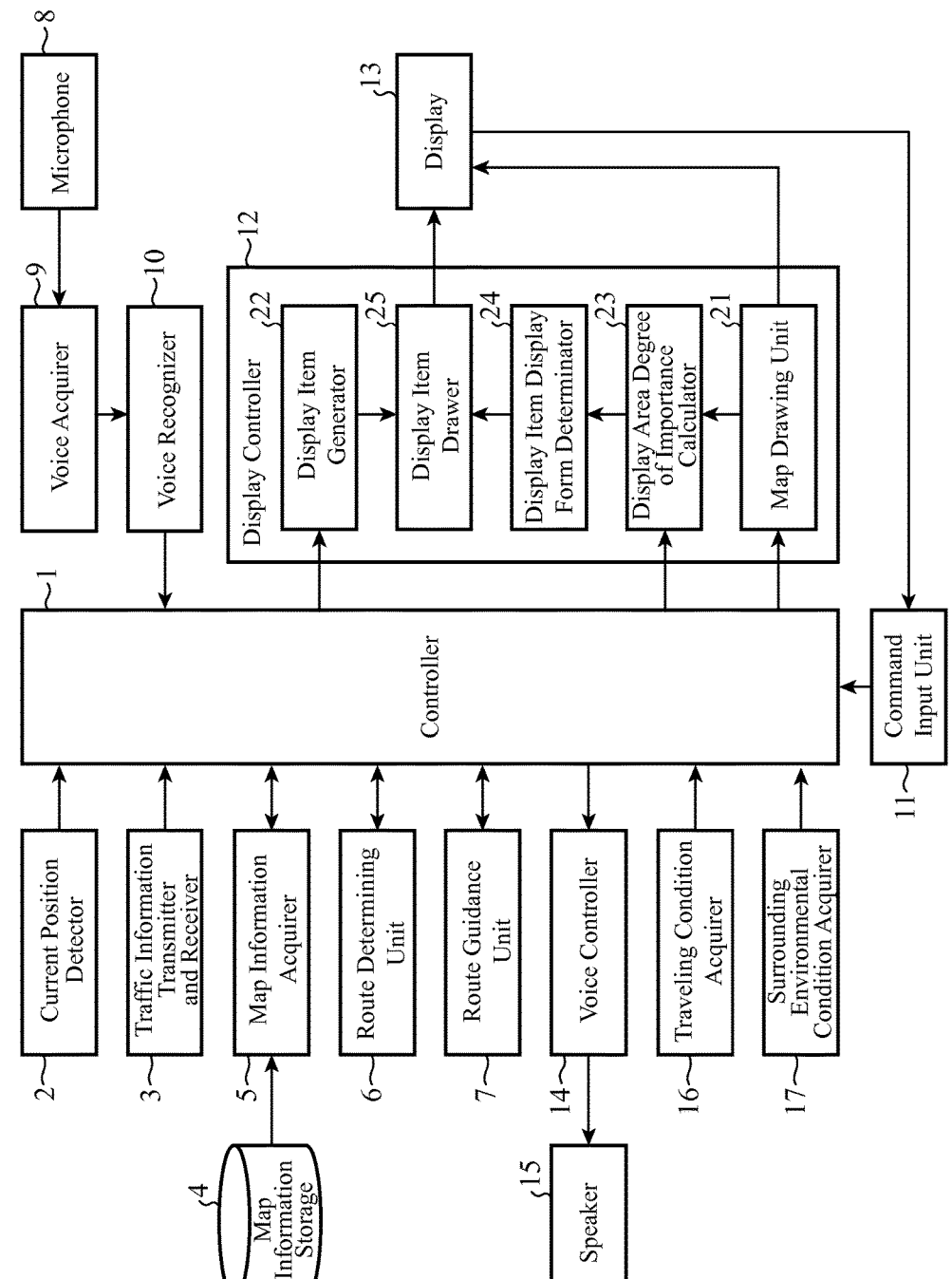
FIG. 1 is a block diagram showing an example of a navigation device to which a voice recognition device in accordance with Embodiment 1 is applied.

FIG. 1 is a block diagram showing an example of a navigation device to which a voice recognition device in accordance with Embodiment 1 of the present invention is applied. This navigation device includes a controller 1, a current position detector 2, a traffic information transmitter and receiver 3, a map information storage 4, a map information acquirer 5, a route determining unit 6, a route guidance unit 7, a microphone 8, a voice acquirer 9, a voice recognizer 10, a command input unit 11, a display controller 12, a display 13, a voice controller 14, a speaker 15, a traveling condition acquirer 16, and a surrounding environmental condition acquirer 17, and displays a map on the display 13 and provides route guidance for a moving object such as a vehicle.

The controller 1 controls the operation of the entire navigation device.

The current position detector 2 detects the current position and the traveling direction of the vehicle by using, for example, a GPS receiver and so on.

The traffic information transmitter and receiver 3 receives traffic information provided by an FM multiplex broadcast, a radio wave beacon, or a light beacon (which is represented by VICS (Vehicle Information & Communication System/registered trademark)), congestion information provided by DSRC (Dedicate Short Range Communication), and so on. The traffic information transmitter and receiver also transmits information about the vehicle, e.g., probe information such as the current position.

The map information storage 4 stores, for example, data such as "road information" about roads, "facility information" about facilities (types, names, positions, etc.), "various pieces of character information" (place names, facility names, intersection names, road names, etc.), "various pieces of icon information" each showing a facility, a road number, or the like, and pieces of information for guidance which are used in the route guidance unit (position information about predetermined key points, drawing information at each of the key points, further, voice guidance information, etc.). The map information storage can be, for example, an HDD (Hard Disk Drive) or a memory, such as an SD card, using a semiconductor device. As an alternative, the map information storage can exist on a network and be configured (map data acquirer) to be able to acquire information, such as road data, via a communication network.

When receiving a map information acquisition command, a facility information acquisition command, or the like, the map information acquirer 5 searches through the map information storage 4 to acquire necessary information.

On the basis of a point which is set by a user through the command input unit 11 which will be mentioned later or a voice operation, the position information detected by the current position detector 2, and map information acquired by the map information acquirer 5, the route determining unit 6 determines an optimal route (referred to as "a recommended route" from here on) from the current position to the set point.

The route guidance unit 7 generates a route guidance diagram and a route guidance message for providing guidance at a time when the vehicle travels along the route determined by the route determining unit 6 on the basis of the map information acquired by the map information acquirer 5.

The microphone 8 acquires (sound-collects) a voice uttered by the user. As the microphone 8, for example, there is provided an omnidirectional (or nondirectional) microphone, an array microphone in which a plurality of omnidirectional (or nondirectional) microphones are arranged in an array form, and its directional characteristics are made to be adjustable, or a unidirectional microphone which has directivity only in a single direction and whose directional characteristics cannot be adjusted.

The voice acquirer 9 captures a user's utterance acquired by the microphone 8, i.e., an inputted voice, and A/D (Analog/Digital) converts the inputted voice by using, for example, PCM (Pulse Code Modulation).

Although it is assumed in the following explanation that the microphone 8 and the voice acquirer 9 are disposed separately as mentioned above, the voice acquirer 9 can be alternatively built in the microphone 8.

The voice recognizer 10 detects a voice section corresponding to the contents which the user has uttered from a voice signal digitized by the voice acquirer 9, extracts a feature quantity of voice data about this voice section, performs a recognition process on the basis of the feature quantity by using a voice recognition dictionary, and outputs a recognition result. The recognition process can be performed by using, for example, a typical method such as an HMM (Hidden Markov Model) method.

In this embodiment, as a voice recognition method, either of word recognition based on grammar, keyword spotting, large-size vocabulary continuous voice recognition, and another well-known method can be used.

It is further assumed that the voice recognizer 10 includes a well-known intention understanding process, and can output, as a recognition result, a result of estimating or retrieving the user's intention from a recognition result provided by large-size vocabulary continuous voice recognition.

By the way, in a voice recognition function mounted in car navigation systems and so on, it is general that the user specifies (commands) a start of his or her utterance for the system. Therefore, a button for commanding a voice recognition start (referred to as "a voice recognition start commander" from here on) is displayed on the touch panel or installed in the steering wheel. The voice recognizer then recognizes a voice uttered after the voice recognition start commander is pressed by the user. More specifically, the voice recognition start commander outputs a voice recognition start signal, and, when receiving this signal, the voice recognizer detects a voice section corresponding to the contents which the user has uttered from the voice data acquired by the voice acquirer after receiving the signal, and performs the above-mentioned recognition process.

Although the voice recognizer 10 in accordance with this Embodiment 1 can perform voice recognition according to a voice recognition start command as mentioned above which is provided by the user, or can recognize the contents which the user has uttered at all times even if such a command is not provided, an explanation will be made hereafter by assuming that the voice recognizer performs voice recognition at all times. More specifically, even if the voice recognizer 10 does not receive a voice recognition start signal, the voice recognizer 10 repeatedly performs the process of, at all times, detecting a voice section corresponding to the contents which the user has uttered from the voice data acquired by the voice acquirer 9, extracting a feature quantity of the voice data about this voice section, performing the recognition process on the basis of the feature quantity by using the voice recognition dictionary, and outputting a voice recognition result. The same goes for the following embodiments.

The command input unit 11 inputs a command through a user's manual operation. This command is provided by, for example, a hardware switch disposed in the navigation device, a touch sensor set and displayed on the display 13 which will be mentioned later, a recognition device that recognizes a command issued by a remote controller installed in a steering wheel or the like or a remote controller separately disposed, and a command provided through a gesture operation, or the like.

The display controller 12 is comprised of a map drawing unit 21, a display item generator 22, a display area degree of importance calculator 23, a display item display form determinator 24, and a display item drawer 25, and acquires necessary information from the current position detector 2, the traffic information transmitter and receiver 3, the map information acquirer 5, the route determining unit 6, the route guidance unit 7, and the voice recognizer 10, generates drawing information (a map and a display item corresponding to the voice recognition result) which is to be drawn on the display 13 which will be mentioned later by using the acquired information, and outputs a command for displaying the drawing information (the map and the display item) to the display 13.

In this case, the map drawing unit 21 causes the display 13 to display a map screen, such as a general navigation screen, by using the current position information detected by the current position detector 2, the traffic information received by the traffic information transmitter and receiver 3, the route information determined by the route determining unit 6, the guidance information outputted by the route guidance unit 7, the information acquired by the map information acquirer 5, and so on.

The display item generator 22, the display area degree of importance calculator 23, the display item display form determinator 24, and the display item drawer 25 will be mentioned later.

The display 13 is a display-integrated type touch panel, and is comprised, for example, an LCD (Liquid Crystal Display) and a touch sensor. As the touch panel, any of a one of pressure sensitive type, a one of electromagnetic induction type, a one of capacitive sensing type, or a one which is a combination of some of these types can be used. Further, instead of the LCD, an organic electroluminescence display can be used.

Further, the display 13 has a plurality of display areas. According to a command from the display item drawer 25 which will be mentioned later, the display item generated by the display item generator 22 which will be mentioned later is displayed in either one of the plurality of display areas.

The voice controller 14 outputs a command for outputting voice information for guidance from the route guidance unit 7 to the speaker 15.

The speaker 15 outputs the voice according to the command from the voice controller 14.

The traveling condition acquirer 16 acquires a traveling condition of the vehicle, such as the traveling speed of the vehicle, whether or not the vehicle is accelerating, or whether the vehicle is blinking either a right turn signal or a left turn signal, by using various sensors and so on.

The surrounding environmental condition acquirer 17 acquires a surrounding environmental condition of the vehicle, such as the current time, the brightness in the surroundings of the vehicle, the weather in the surroundings of the vehicle, or a traffic congestion condition in the surroundings of the vehicle, by using various sensors and so on.

Hereafter, a recognition result outputted by the voice recognizer 10, a display item corresponding to the recognition result (referred to as "a display item" from here on), a display area in which the display item is displayed (referred to as "the display area" from here on), and the degree of importance of each display area (referred to as "the degree of importance" from here on), which are used in a subsequent explanation, will be explained.

First, a recognition result outputted by the voice recognizer 10 will be explained.

The voice recognizer 10 recognizes a user's utterance, and outputs, as a recognition result, a genre name (referred to as "a facility genre name" from here on) to which a facility, such as "restaurant", "convenience store", or "gas station", belongs.

Although an explanation will be made in this Embodiment 1 by assuming that a facility genre name is outputted as a recognition result, the present embodiment is not limited to this example. For example, an artist name, an album name, a music title name, a command for operating a car navigation system, a word showing a feeling such as "cold", or the like can be outputted as a recognition result.

Next, a display item will be explained. A display item is expressed by, for example, a combination of a character string showing a recognition result outputted by the voice recognizer 10, and a graphic corresponding to the recognition result, and is a one to which a function corresponding to the recognition result is assigned. More specifically, a display item is, for example, an operation button. By pressing this operation button, the user can cause the navigation device to perform the function assigned to the operation button.

For example, when a recognition result outputted by the voice recognizer 10 is a facility genre name, such as "restaurant", "convenience store", or "gas station", the display item is expressed by a combination of a character string, such as "restaurant", "convenience store", or "gas station" which is the facility genre name, and a graphic, such as an icon, corresponding to the character string, and is an operation button to which a function of searching for such facilities is assigned.

Although the explanation is made in this Embodiment 1 by assuming that the display item is such a one as above, the present embodiment is not limited to this example. For example, the display item can be expressed only by either one of a graphic and a character string, or can be a content corresponding to the recognition result, such as a video or a still image, or a character corresponding to the recognition result. Further, the display item can be a one to which no function is assigned.

Further, when the recognition result is a word showing a feeling such as "cold", instead of displaying such the character string as "cold" as the display item, just as it is, the intention of the feeling "cold" can be interpreted and, for example, a graphic showing a control button of an air conditioner, or the like, and an operation button to which its function is assigned can be provided as the display item.

Figure 2:
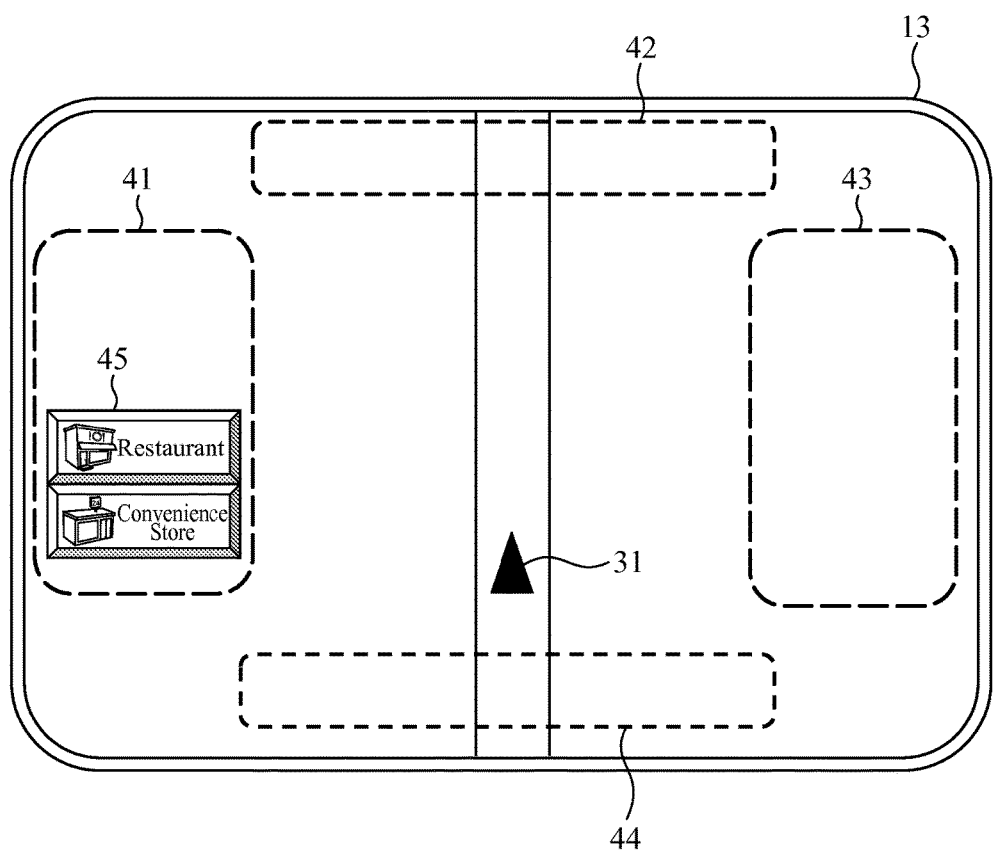
FIG. 2 is a diagram showing a plurality of display areas on a display in a state in which a map screen is displayed on the display.

Next, display areas will be explained. Each display area is an area on the display 13 in which a display item is displayed. For example, as shown in FIG. 2, a plurality of display areas 41, 42, 43, and 44 are predetermined. Although the explanation is made in this Embodiment 1 by assuming that the number of display areas displayed on the display screen of the display 13 and their positions are four as shown in FIG. 2, the present embodiment is not limited to this example.

Next, the degree of importance will be explained. The degree of importance is calculated for each display area by the display area degree of importance calculator 23. For example, the degree of importance of a display area increases with increase in the amount of information, such as congestion information and guidance information, other than display items, which is displayed in the display area and which is necessary for the user. Further, the higher the degree of importance of a display area, the lower the probability that a display item is displayed in the display area.

The display item generating unit 22 generates a display item corresponding to the recognition result outputted by the voice recognizer 10.

The display area degree of importance calculator 23 calculates the degree of importance for each display area by using the current position information detected by the current position detector 2, the traffic information received by the traffic information transmitter and receiver 3, the route information determined by the route determining unit 6, the guidance information outputted by the route guidance unit 7, the information acquired by the map information acquirer 5, and so on.

Although the explanation is made in this Embodiment 1 by assuming that the display area degree of importance calculator 23 calculates the degree of importance at all times, the display area degree of importance calculator can alternatively calculate the degree of importance at predetermined intervals or when a predetermined command is provided therefor.

The display item display form determinator 24 determines one or more display areas in each of which a display item is to be displayed on the basis of the degree of importance of each display area calculated by the display area degree of importance calculator 23, and outputs a command for displaying the display item in each determined display area to the display item drawer 25.

Although it is assumed in this Embodiment 1 that the degree of importance has a value ranging from 0 to 100, the present embodiment is not limited to this example.

In addition, it is assumed in this Embodiment 1 that when the result of the calculation of the degree of importance exceeds the upper limit, the degree of importance is set to 100.

The display item drawing unit 25 outputs a command for displaying the display item generated by the display item generating unit 22 in each display area determined by the display item display mode determining unit 24 to the display 13. Further, the display item drawer 25 manages the display time when the display item is displayed in the display area and the largest display number of display items, and outputs a command for erasing a display item whose display time has elapsed, and a command for, when the number of display items in the display area exceeds the largest display number, displaying a newly generated display item by, for example, erasing a display item which has been displayed for the longest period of time to the display 13.

Next, the calculation of the degree of importance of each display area which is performed by the display area degree of importance calculator 23 will be explained.

The display area degree of importance calculator 23 examines at least one of items (1) to (12) which will be mentioned later, and calculates the sum total of the degree of importance determined for each item as the degree of importance of a display area. The display area degree of importance calculator performs this process for each display area. The one or more items examined by the display area degree of importance calculator 23 can be predetermined or can be selected arbitrarily by the user.

(1) "Whether or not a display area is placed in the traveling direction or a planned traveling direction of the vehicle"

First, a case in which the display area degree of importance calculator 23 calculates the degree of importance on the basis of a positional relationship between "the traveling direction or the planned traveling direction of the vehicle 31", which is displayed on the display 13, and each display area will be explained.

Figure 3:
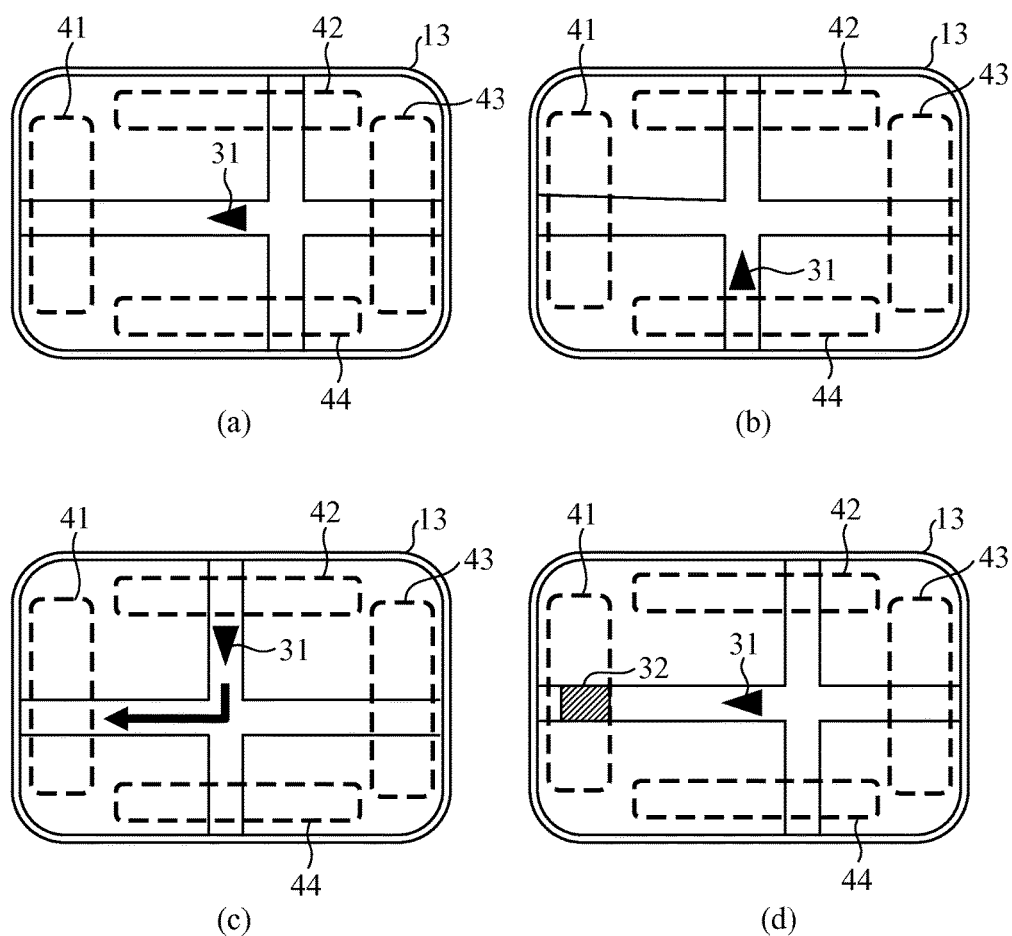
FIG. 3 is a diagram showing a positional relationship among the map screen, the traveling direction of a vehicle, and the plurality of display areas.

FIG. 3 is a diagram showing a positional relationship among a map screen, the traveling direction or the planned traveling direction of the vehicle 31, and the plurality of display areas 41, 42, 43, and 44.

When a map is displayed on the display 13 while being oriented north-up, the traveling direction means "the bearing in which the vehicle is actually traveling." In this case, when a map is displayed while being oriented north-up and the vehicle 31 is traveling in a westward direction, as shown in FIG. 3(a), the display area placed in the traveling direction of the vehicle is "the display area 41."

Further, when a map is displayed on the display 13 while being oriented heading-up, the traveling direction means "an upward direction on the display screen." In this case, when a display as shown in FIG. 3(b) is produced, the display area in the traveling direction of the vehicle 31 is "the display area 42."

Further, when an instruction for making a right turn (or left turn) is provided for the vehicle 31, "the actual bearing of the vehicle after making a right turn (or left turn)" or "a direction on the display screen in which the vehicle will travel after making a right turn (or left turn)" is the direction in which the vehicle is planned to travel from now on, i.e., "the planned traveling direction."

In this case, when a display as shown in FIG. 3(c) is produced, the display area in the planned traveling direction of the vehicle 31 is "the display area 41."

Because while the navigation device is placed in a state of performing route guidance by using the navigation function, the planned traveling direction of the vehicle can be grasped from the route, when it is determined on the basis of the grasp that the distance to a point where the vehicle will make a right turn (or left turn) becomes equal to or shorter than a predetermined distance (e.g., 100 meters), "a direction on the display screen in which the vehicle will travel after making a right turn (or left turn)" can be set as the planned traveling direction.

The display area degree of importance calculator 23 acquires the current traveling direction or the planned traveling direction of the vehicle from the current position detector 2, and specifies the display area placed in the traveling direction or the planned traveling direction.

Information about the position and the range in the display 13 of each display area can be stored in advance in the display area degree of importance calculator 23. As an alternative, the information can be stored in another component and can be acquired from the component.

An example of the degree of importance of the display area in the traveling direction or the planned traveling direction of the vehicle is shown in a table of FIG. 4(a). The display area degree of importance calculator 23 refers to this FIG. 4(a), and determines the degree of importance of the display area which is specified to be placed in the traveling direction or the planned traveling direction of the vehicle.

For example, when a map is displayed while being oriented north-up and the traveling direction of the vehicle 31 is a westward direction, as shown in FIG. 3(a), the display area degree of importance calculator refers to the table of FIG. 4(a) and determines the degree of importance of the display area 41 to be "20."

Next, a case in which the display area degree of importance calculator 23 calculates the degree of importance on the basis of the display state of traffic information on the map in the display area will be explained.

The display area degree of importance calculator 23 acquires the traffic information from the traffic information transmitter and receiver 3, and when determining that the traffic information is displayed on a road in the traveling direction or the planned traveling direction of the vehicle, can determine the degree of importance in consideration of the traffic information currently being displayed. The traffic information is either traffic information showing that the road is congested or under construction, or an accident has occurred, or other traffic information.

FIG. 4(b) is a table showing an example of a correspondence between information on the road in the traveling direction or the planned traveling direction of the vehicle, and the degree of importance of the display area.

For example, when a display 32 of congestion information is produced on the road in the traveling direction of the vehicle 31, as shown in FIG. 3(d), the display area degree of importance calculator 23 refers to the table of FIG. 4(b) and determines the degree of importance of the display area 41 to be "25."

Although the degrees of importance for the three items including congestion information, construction information, and accident information are made to be the same in the table of FIG. 4(b), the present embodiment is not limited to this example. Further, an item other than these three items can be provided.

(2) "The presence or absence of facility icons currently being displayed in a display area and the number of facility icons"

As to this item, a case in which the display area degree of importance calculator 23 calculates the degree of importance on the basis of the display state of icons on the map in a display area will be explained.

Figures 5, 6:
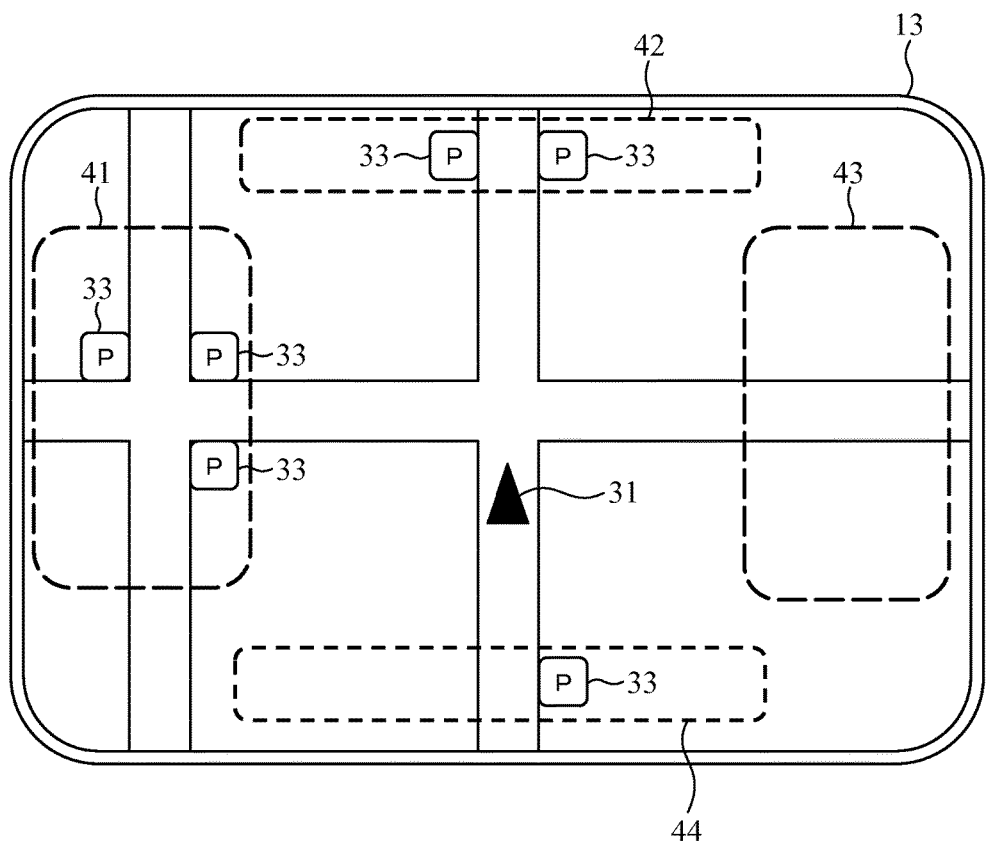
FIG. 5 is a diagram showing an example of a screen on which facility icons, such as parking lots, are displayed in a display area in a state in which a map screen is displayed on the display.
FIG. 6 is a table showing a correspondence between the number of facility icons and the degree of importance of a display area.

FIG. 5 is a diagram showing an example of the screen on which facility icons 33, such as parking lots, are displayed in the display areas 41 to 44 in a state in which a map screen is displayed on the display 13.

For example, the display area degree of importance calculator 23 acquires the map information generated by the map drawing unit 21, and determines the presence or absence of information about facility icons 33 and the number of facility icons with respect to a range corresponding to each of the display areas.

Then, when a facility icon 33 exists in a display area, the display area degree of importance calculator 23 determines the degree of importance of the display area to be, for example, "10."

Further, FIG. 6 is a table showing a correspondence between the number of facility icons 33 in a display area and the degree of importance of the display area.

As shown in this FIG. 6, the degree of importance can be changed with increase in the number of facility icons 33.

For example, in the case of determining the degree of importance of a display area according to the number of facility icons, because one facility icon 33 exists in the display area 44, the display area degree of importance calculator determines the degree of importance of this area to be "10" with reference to FIG. 6. In the same way, because two facility icons 33 exist in the display area 42, the display area degree of importance calculator determines the degree of importance of this area to be "20", and because three facility icons 33 exist in the display area 41, determines the degree of importance of this area to be "30."

(3) "The presence or absence of points currently being displayed in a display area and set by the user, and the number of points"

As to this item, a case in which the display area degree of importance calculator 23 calculates the degree of importance on the basis of the presence or absence of points currently being displayed in a display area and set by the user, and the number of points will be explained.

For example, the area degree of importance calculator 23 acquires the map information generated by the map drawing unit 21, and determines the presence or absence of a destination, waypoints, registration places, etc. which are set by the user (referred to as "set point icons" from here on) and the number of set point icons with respect to the range corresponding to each of the display areas.

For example, when a set point icon exists in a display area, the display area degree of importance calculator 23 determines the degree of importance of this area to be "10." Further, like in the case of above-mentioned (2), the degree of importance can be made to increase with increase in the number of set point icons.

(4) "The type of the road along which the vehicle is traveling"

As to this item, a case in which the display area degree of importance calculator 23 calculates the degree of importance on the basis of the type of the road along which the vehicle 31 is traveling will be explained. In this case, as the road type, for example, "highway", "local road", "tunnel", or the like is provided.

For example, the display area degree of importance calculator 23 acquires the vehicle position information detected by the current position detector 2, and acquires the road type of the road along which the vehicle is traveling, the road type being acquired by the map information acquirer 5 from the map information storage 4 by using the vehicle position information.

FIG. 7 is a table showing an example of the degree of importance of a display area for each road type.

The display area degree of importance calculator 23 refers to the table of FIG. 7, and determines the degree of importance corresponding to the acquired road type as the degree of importance of each of the display areas.

Although in FIG. 7, assuming that the degree of importance for the user of map information displayed at a time when the vehicle is traveling along a local road is higher than that of map information displayed at a time when the vehicle is traveling along another type of road, the degree of importance of each of the display areas is set to be a higher value, the present embodiment is not limited to this example.

(5) "The area in which the vehicle is traveling"

As to this item, a case in which the display area degree of importance calculator 23 calculates the degree of importance on the basis of the type of the area in which the vehicle 31 is traveling will be explained. In this case, as the area type, for example, "urban area", "suburban area", "in mountains", "on the sea", or the like is provided.

The display area degree of importance calculator 23 acquires the vehicle position information detected by the current position detector 2, and acquires the area type of the area in which the vehicle is traveling, the area type being acquired by the map information acquirer 5 from the map information storage 4 by using the vehicle position information.

FIG. 8 is a table showing an example of the degree of importance for each area type.

The display area degree of importance calculator 23 determines, as the degree of importance of each of the display areas, the degree of importance corresponding to the acquired area type with reference to the table of FIG. 8.

In the table of FIG. 8, the degree of importance corresponding to "urban area" is set to a high value because the amount of information displayed on the map while the vehicle is traveling in an urban area is large, the degree of importance corresponding to "suburban area" is set to a low value because the amount of information displayed on the map while the vehicle is traveling in a suburban area is small, and the degree of importance is set to the lowest value while the vehicle is traveling in mountains or on the sea with little information displayed on the map (the display area is on the sea while, for example, the vehicle is traveling on a bridge or along a coastal road). However, the present embodiment is not limited to this example.

(6) "The graphical scale of the map"

As to this item, a case in which the display area degree of importance calculator 23 calculates the degree of importance on the basis of the graphical scale of the map currently being displayed on the display 13 will be explained. In this case, as the graphical scale, for example, "25 m", "50 m", "100 m", . . . , "500 m", "1 km", "3 km", "5 km", or the like which is the distance corresponding to the scale which serves as a reference is set.

For example, the display area degree of importance calculator 23 acquires the graphical scale of the current map from a setting storage unit (not shown) or the like that stores various settings made by the user.

FIG. 9 is a table showing an example of the degree of importance for each graphical scale.

The display area degree of importance calculator 23 determines, as the degree of importance of each of the display areas, the degree of importance corresponding to the acquired graphical scale with reference to the table of FIG. 9.

Although the degree of importance is made to increase with decrease in the graphical scale in the table of FIG. 9 by assuming that the degree of importance of the map information currently being displayed increases with decrease in the graphical scale (as the map is enlarged), the present embodiment is not limited to this example.

(7) "The presence or absence of display of guidance information/warning information in a display area"

As to this item, a case in which the display area degree of importance calculator 23 calculates the degree of importance on the basis of the display state of guidance information/warning information in a display area will be explained.

Figure 10:
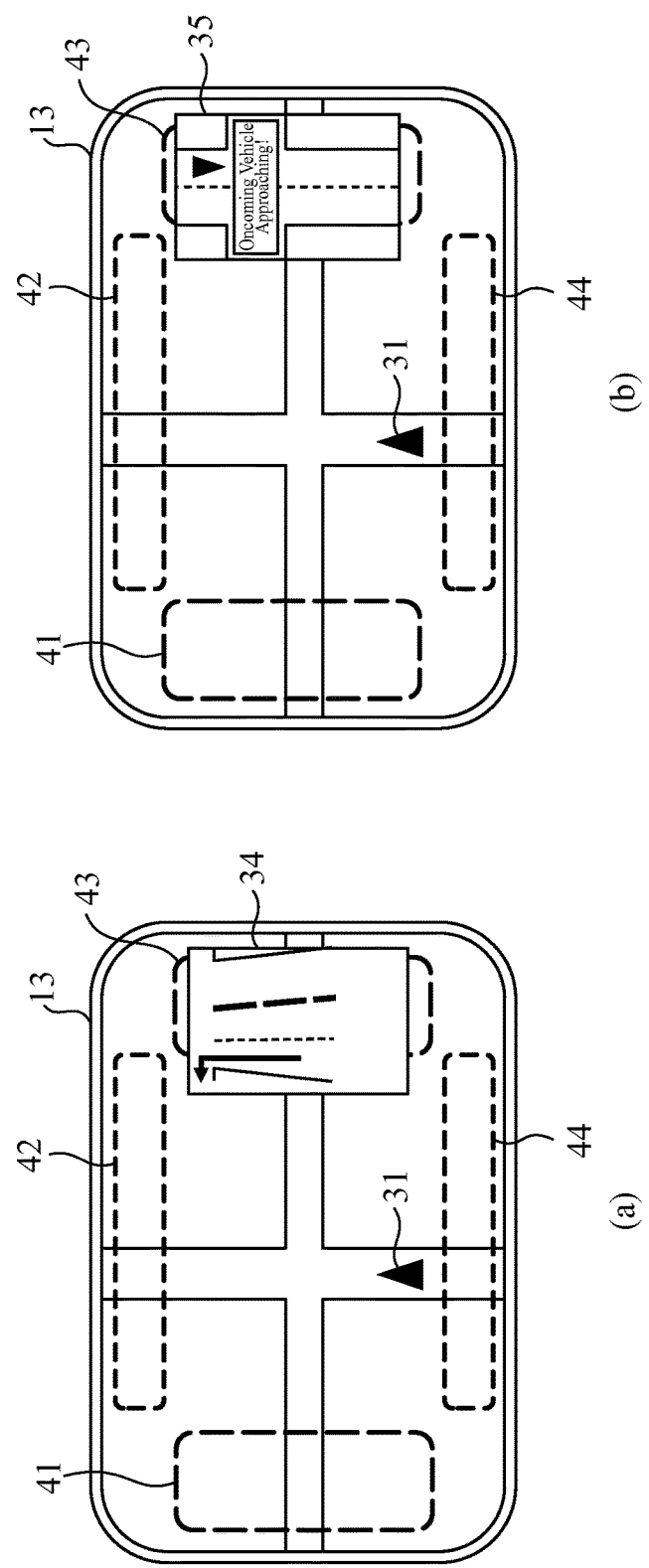
FIG. 10 is a diagram showing an example of a screen on which guidance information or warning information is displayed in a display area in a state in which a map screen is displayed on the display.

FIG. 10 is a diagram showing an example of the screen on which guidance information 34 or warning information 35 is displayed in a display area in a state in which a map screen is displayed on the display 13.

For example, the display area degree of importance calculator 23 acquires the map information generated by the map drawing unit 21, the information received by the traffic information transmitter and receiver 3, and the information generated by the route guidance unit 7, and determines whether or not an output of guidance information 34 or warning information 35, such as a display of intersection guidance as shown in FIG. 10(a) or a display of a warning as shown in FIG. 10(b), is produced with respect to the range corresponding to each of the display areas.

FIG. 11 is a table showing an example of a correspondence between guidance information/warning information and the degree of importance.

When guidance information 34 or warning information 35 is outputted to a display area, the display area degree of importance calculator 23 refers to the table of FIG. 11 and determines the degree of importance corresponding to the guidance information 34 or the warning information 35.

The guidance information/warning information and the degree of importance of a display area are not limited to the descriptions shown in FIG. 11, and the number of items can be increased or the degree of importance for each item can differ from each other.

(8) "The traveling condition of the vehicle"

As to this item, a case in which the display area degree of importance calculator 23 calculates the degree of importance on the basis of the traveling condition of the vehicle 31 will be explained.

FIG. 12 is a table showing an example of a correspondence between the traveling condition of the vehicle and the degree of importance of a display area.

For example, when the traveling speed of the vehicle is equal to or higher than a predetermined speed, the vehicle is accelerating, or the vehicle is blinking either a right turn signal or a left turn signal, it is determined that the vehicle is in a traveling condition that the user must concentrate on driving the vehicle, the degree of importance of each of the display areas is increased; otherwise, the degree of importance is decreased. In this way, on the basis of the traveling condition of the vehicle, the degree of importance is determined.

In the example shown in FIG. 12, when the traveling speed of the vehicle is equal to or higher than the predetermined speed (e.g., 60 km/h), the degree of importance is set to 20, when the vehicle is accelerating, the degree of importance is set to 25, and when the vehicle is blinking either a right turn signal or a left turn signal, the degree of importance is set to 25. As an alternative, the degree of importance can be changed step by step according to the traveling condition of the vehicle by, for example, setting the degree of importance to 20 when the traveling speed of the vehicle is equal to or higher than 60 km/h and is lower than 80 km/h, setting the degree of importance to 30 when the traveling speed is equal to or higher than 80 km/h, and so on.

(9) "The surrounding environmental condition of the vehicle"

As to this item, a case in which the display area degree of importance calculator 23 calculates the degree of importance on the basis of the surrounding environmental condition of the vehicle 31 will be explained.

FIG. 13 is a table showing an example of a correspondence between the surrounding environmental condition of the vehicle, and the degree of importance of a display area.

For example, when the current time when the vehicle is traveling falls within night times (between 19:00 to 6:00), the illumination (brightness) in the surroundings is equal to or less than a predetermined threshold, the weather is rain or snow, or congestion has occurred in the surroundings of the vehicle, it is determined that the surroundings are in a surrounding environmental condition that the surroundings are hard to see for the user or the user must concentrate on driving the vehicle, and the degree of importance of each of the display areas is increased; otherwise, the degree of importance is decreased. In this way, on the basis of the surrounding environmental condition of the vehicle, the degree of importance is determined.

In the example shown in FIG. 13, when the current time when the vehicle is traveling falls within night times (between 19:00 to 6:00), the degree of importance is set to 10, when the illumination (brightness) in the surroundings is equal to or less than the predetermined threshold, the degree of importance is set to 10, when the weather in the surroundings of the vehicle is rain or snow, the degree of importance is set to 20, and when congestion has occurred in the surroundings of the vehicle, the degree of importance is set to 25. As an alternative, the degree of importance can be changed step by step according to the surrounding environmental condition of the vehicle by, for example, by setting the degree of importance to 20 when the weather in the surroundings of the vehicle is rain or snow, setting the degree of importance to 10 when the weather in the surroundings of the vehicle is cloudy, and so on.

(10) "A relation between the contents of a display item and the display screen"

As to this item, a case in which the display area degree of importance calculator 23 calculates the degree of importance on the basis of a relation between the contents of a display item displayed in a display area and the display screen currently being displayed on the display 13 will be explained.

Hereafter, an explanation will be made by assuming that the target for voice recognition is, for example, words associated a piece of music, such as an artist name, an album name, or a music title name. In this case, when voice recognition is performed on those words, the contents of a display item corresponding to a result of the recognition are also words associated with a piece of music, and a display item showing an artist name, a display item showing an album name, a display item showing a music title, or the like is displayed.

At this time, when the display screen currently being displayed on the display 13 is an AV screen (screen for playback of a piece of music), because it can be assumed that the user is in a state in which the user is listening to music, and even if a display item associated with playback of the piece of music is displayed, this display could not interfere with the user, the degree of importance of each of the display areas can be set to a low value.

In contrast, when the display screen currently being displayed on the display 13 is a normal map screen, because it can be assumed that the user is in a state in which the user wants to look at map information about route guidance, and when an operation button associated with playback of a piece of music is displayed as a display item corresponding to the voice recognition result, this display could interfere with the user's driving, it is necessary to set the degree of importance of each of the display areas to a high value.

FIG. 14 is a table showing an example of the degree of importance of a display area for a combination of the contents of a display item and the display screen currently being displayed.

In this way, according to a relation between the contents of a display item and the display screen actually being displayed on the display 13, when the display item is information important for the user at that time, the degree of importance is set to a low value in order to make it easier for the display item to be displayed, whereas when the display item is assumed to be in a state which the display item is not important for the user at that time, in order to make it more difficult for the display item to be displayed, the degree of importance is set to a high value.

(11) "The presence or absence of another display item currently being displayed in a display area and the number of other display items"

Figures 15, 16:
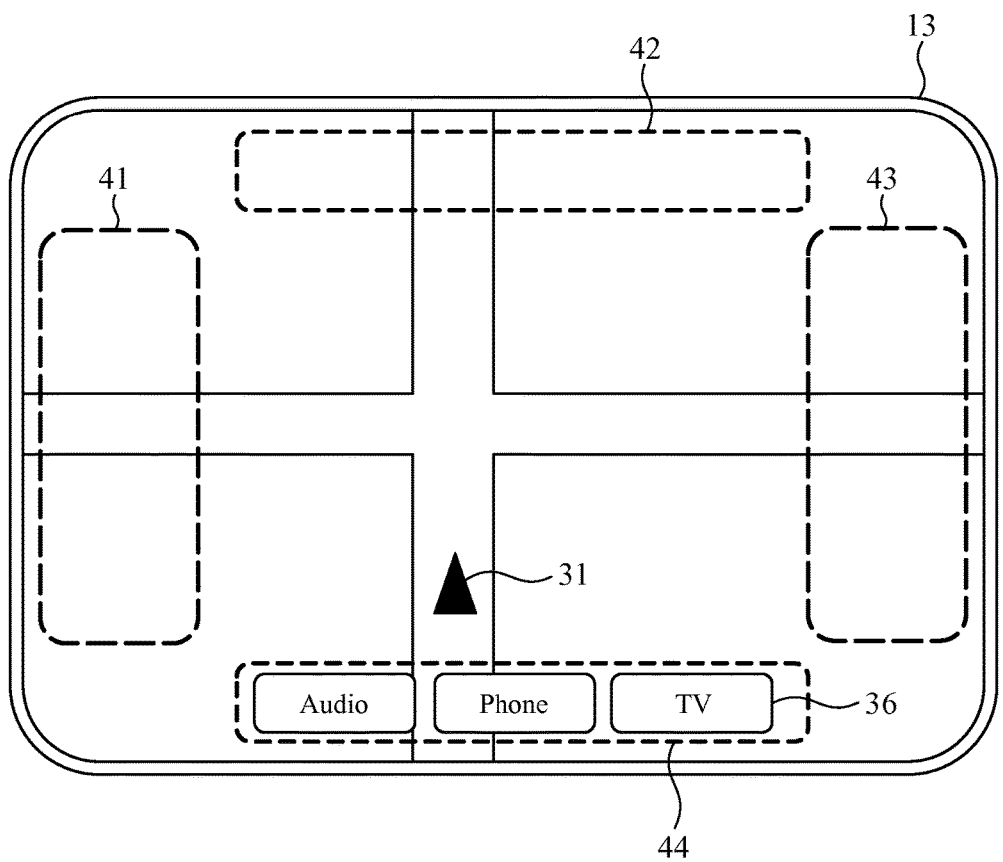
FIG. 15 is a diagram showing an example of a screen on which another display item is displayed in a display area in a state in which a map screen is displayed on the display.
FIG. 16 is a table showing an example of a correspondence between a display mode and the degree of importance of a display area.

As to this item, a case in which the display area degree of importance calculator 23 calculates the degree of importance on the basis of the presence or absence of another display item currently being displayed in a display area, and the number of other display items will be explained. In this case, another display item is, for example, a button 36, as shown in FIG. 15, for making a transition to another screen, such as an audio operation screen or a phone screen, and is a button specific to the device in which the present invention is mounted.

The display area degree of importance calculator 23 acquires information about a display item (referred to as "another display item" from here on) other than a display item corresponding to the recognition result, and determines the presence or absence of another display item and the number of other display items with respect to the range corresponding to each of the display areas.

In this case, because another display item is necessary when the user operates the navigation device (device in which the voice recognition device in accordance with the present invention is mounted), when determining that another display item exists in a display area, the display area degree of importance calculator 23 determines the degree of importance to be "30." Further, like in the case of the above-mentioned item (2), the degree of importance can be increased with increase in the number of other display items.

(12) "The display mode of the display screen"

As to this item, a case in which the display area degree of importance calculator 23 calculates the degree of importance on the basis of the display mode of the display screen currently being displayed on the display 13 will be explained. In this case, as the screen display mode, "single-screen display", "two-screen display", "3D display", "display at daytime", "display at nighttime", or the like is provided.

For example, the display area degree of importance calculator 23 acquires the current screen display mode from the setting storage (not shown) or the like that stores various settings made by the user.

FIG. 16 is a table showing an example of a correspondence between the display mode and the degree of importance of a display area.

The display area degree of importance calculator 23 determines, as the degree of importance of each of the display areas, the degree of importance corresponding to the acquired display screen mode with reference to the table of FIG. 16.

Hereafter, a case in which a map is displayed while being oriented heading-up, the area in which the vehicle is traveling is an "urban area", and the items examined by the display area degree of importance calculator 23 are the following three ones (1), (2), and (5) in the situation as shown in FIG. 5 will be explained concretely as an example.

First, as to the display area 44, because this display area is not placed in the traveling direction of the vehicle 31, the degree of importance of a result of the examination of (1) by the display area degree of importance calculator 23 is set to "0", and because one icon is displayed, the degree of importance of a result of the examination of (2) is set to "10." Further, because the area in which the vehicle is traveling is an "urban area", the degree of importance of a result of the examination of (5) is set to "15."

As a result, the degree of importance of the display area 44 is calculated to be 0+10+15=25. In the same way, the degree of importance of the display area 43 is calculated to be 0+0+15=15, the degree of importance of the display area 42 is calculated to be 20+20+15=55, and the degree of importance of the display area 41 is calculated to be 0+30+15=45.

Next, a method, which the display item display form determinator 24 uses, of determining the display area in which a display item generated by the display item generator 22 is to be displayed on the basis of the degree of importance of each of the display areas calculated by the display area degree of importance calculator 23 will be explained.

Hereafter, it is assumed in this Embodiment 1 that one display area is specified in advance by the system or the user. Hereafter, this display area is referred to as "the display area specified in advance by the system or the like."

A predetermined threshold (a threshold for display area determination, which is referred to as "a first threshold" from here on) is preset to the display item display form determinator 24, and when the degree of importance of the display area specified in advance by the system or the like is equal to or less than the first threshold (or less than the first threshold), the display area specified in advance is determined as the display area in which a display item is to be displayed.

In contrast, when the degree of importance of the display area specified in advance by the system or the like is greater than the predetermined first threshold (or equal to or greater than the first threshold), another display area whose degree of importance is equal to or less than the first threshold (or less than the first threshold) and is the lowest is determined as the display area in which a display item is to be displayed.

When the degrees of importance of plural other display areas are the same, a display area determined at random from among the other display areas can be determined as the display area in which a display item is to be displayed. As an alternative, priorities which are assigned to other display areas when their degrees of importance are the same can be determined in advance, and a display area having the highest priority can be determined, as the display area in which a display item is to be displayed, according to the above-mentioned priorities. As an alternative, priorities corresponding to the types of display items can be determined.

The predetermined threshold determined for each of the display areas can be the same, and can differ from each other.

Next, processing performed by the navigation device in accordance with Embodiment 1 will be explained by using flow charts shown in FIGS. 17 to 19.

Figure 17:
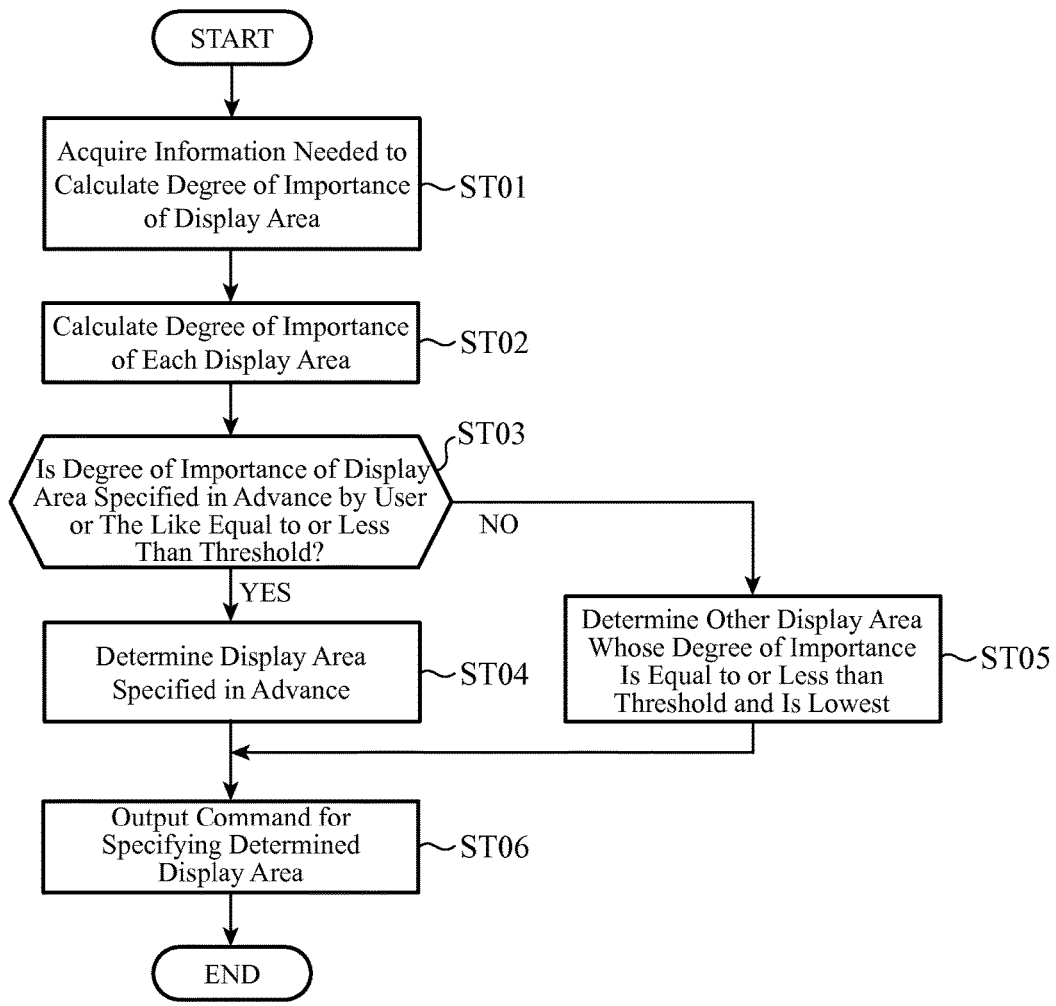
FIG. 17 is a flow chart showing a process of determining a display area in which a display item is to be displayed in Embodiment 1.

FIG. 17 is a flowchart showing the process of determining the display area in which a display item is to be displayed in this Embodiment 1.

First, the display area degree of importance calculator 23 acquires information needed to calculate the degree of display area importance for a major item (one or more of the above-mentioned items (1) to (10)) which is predetermined or selected by the user (step ST01), and calculates the degree of importance of each of the display areas on the basis of the acquired information (step ST02).

Next, the display item display form determinator 24 determines whether or not the degree of importance of the display area specified in advance by the system or the like is equal to or less than the predetermined first threshold (step ST03).

Then, when the degree of importance is equal to or less than the first threshold (when "YES" in step ST03), the display item display form determinator determines the specified display area as the display area in which a display item is to be displayed (step ST04), and outputs a command for specifying the determined display area to the display item drawer 25 (step ST06).

In contrast, when the degree of importance is greater than the first threshold (when "NO" in step ST03), the display item display form determinator determines another display area whose degree of importance is equal to or less than the first threshold and is the lowest as the display area in which a display item is to be displayed (step ST05), and outputs a command for specifying the determined display area to the display item drawer 25 (step ST06).

Figure 18:
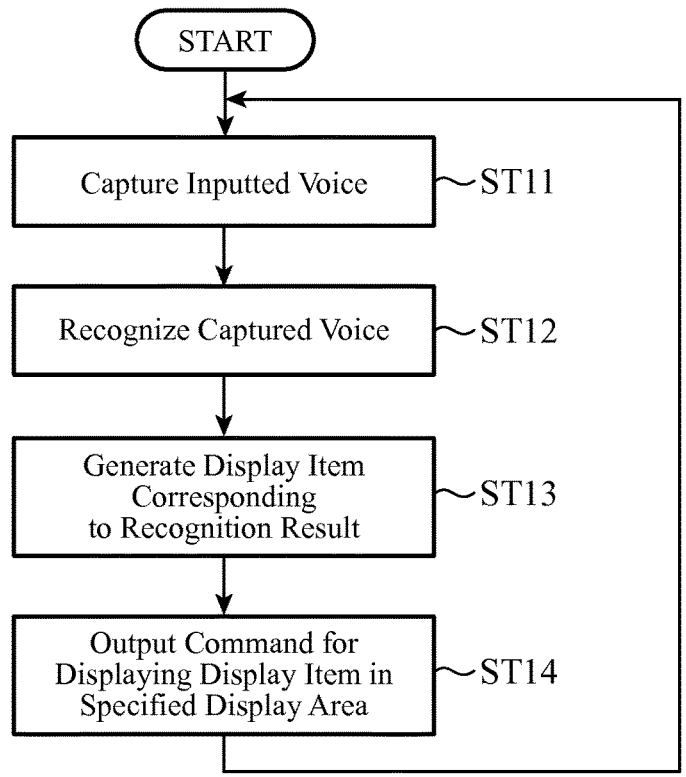
FIG. 18 is a flow chart showing a process of generating and displaying a display item in Embodiment 1.

FIG. 18 is a flow chart showing the process of generating and displaying a display item in this Embodiment 1.

First, the voice acquirer 9 captures a user's utterance collected by the microphone 8, i.e., an inputted voice, and A/D converts this inputted voice by using, for example, PCM (step ST11).

Next, the voice recognizer 10 detects a voice section corresponding to the contents which the user has uttered from a voice signal which is captured and digitized by the voice acquirer 9, extracts a feature quantity of voice data about this voice section, and performs a recognition process on the basis of the feature quantity and with reference to the voice recognition dictionary (step ST12).

The display item generator 22 then generates a display item corresponding to the recognition result outputted by the voice recognizer 10 (step ST13).

After that, the display item drawer 25 outputs a command for displaying the display item generated by the display item generator 22 in the display area determined and specified by the display item display form determinator 24 to the display 13 (step ST14).

Figure 19:
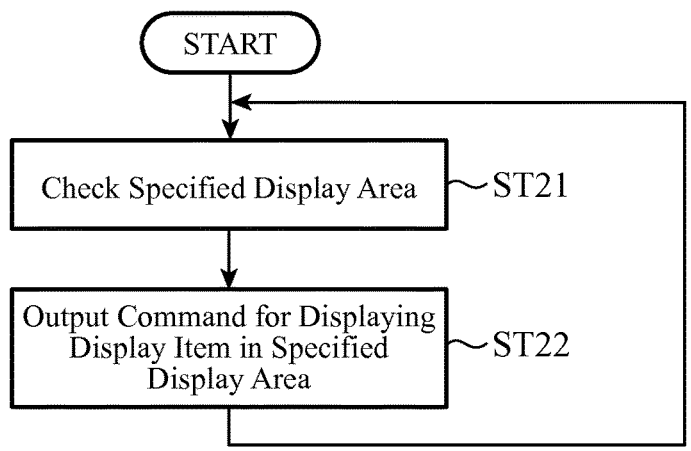
FIG. 19 is a flow chart showing a process of changing the display area of a display item already displayed on the display in Embodiment 1.

FIG. 19 is a flow chart showing the process of changing the display area in which the display item is already displayed on the display 13 in this Embodiment 1.

The display item drawer 25 checks the display area determined and specified by the display item display form determinator 24 (step ST21), and outputs a command for displaying the display item in the specified display area to the display 13 (step ST22).

Hereafter, an explanation will be made with reference to FIGS. 20 and 21 by providing a concrete example.

Figure 20:
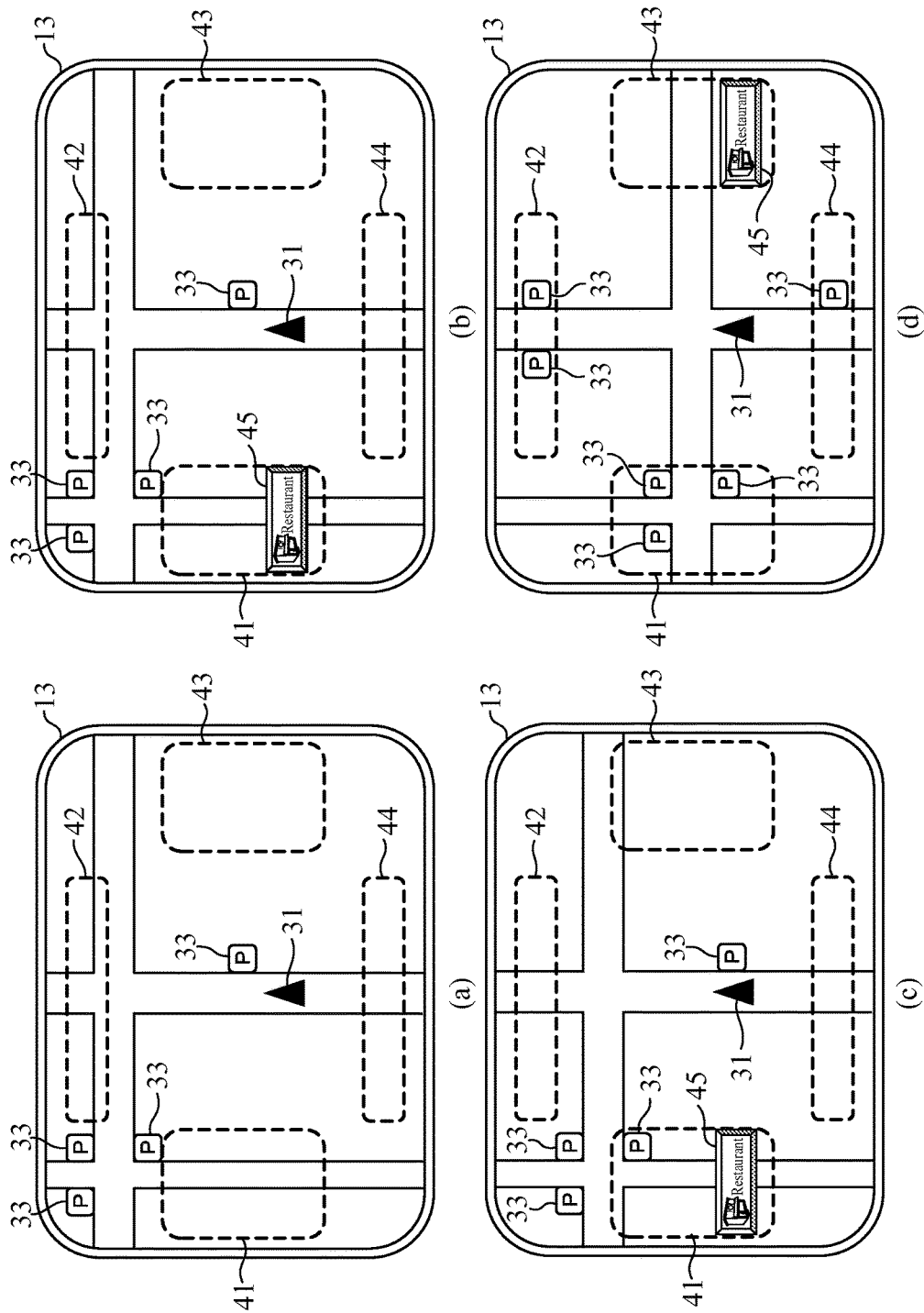
FIG. 20 is a diagram (1) showing an example of a screen transition based on a relation between facility icons and a display item displayed in a display area in a state in which a map screen is displayed on the display.
Figure 21:
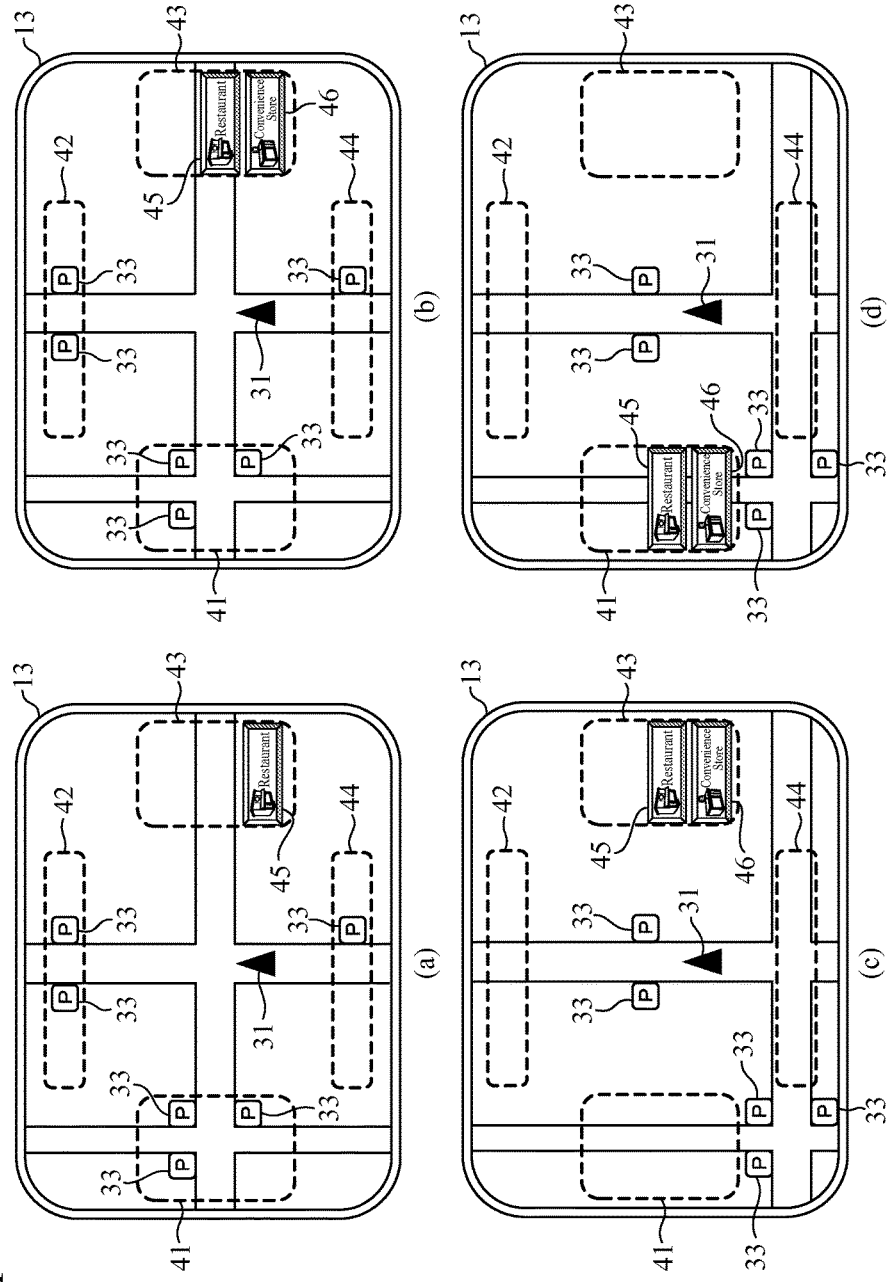
FIG. 21 is a diagram (2) showing an example of a screen transition based on a relation between facility icons and a display item displayed in a display area in a state in which a map screen is displayed on the display.

FIGS. 20 and 21 are diagrams showing an example of a screen transition based on a relation between facility icons 33 and a display item displayed in a display area in a state in which a map screen is displayed on the display 13.

It is assumed that the major item (2) mentioned above is selected as an item for which the degree of importance of each of the display areas is calculated. It is further assumed that a relation between the number of facility icons 33 and the degree of importance is as shown in FIG. 6. Further, it is assumed that the display area specified in advance by the system or the like is the display area 41. In addition, it is assumed that the first threshold set to the display item display form determinator 24 is "25."

First, because the major item (2) is an item for determination, the information needed to calculate the degree of importance in step ST01 of FIG. 17 is range information about each of the display areas 41 to 44 and map information (including facility icon information), and the display area degree of importance calculator 23 acquires these pieces of information (step ST01 of FIG. 17).

Because facility icons 33 exist in neither of the display areas 41 to 44 in the case of FIG. 20(*a*), the display area degree of importance calculator 23 calculates the degrees of importance of all the display areas to be "0" (step ST02 of FIG. 17).

Next, because the degree of importance of the display area 41 specified in advance is equal to or less than the predetermined first threshold (25), the display item display form determinator 24 determines the display area 41 as the display area in which a display item is to be displayed, and outputs a command for specifying the display area to the display item drawer 25 (steps ST04 and ST06 when "YES" in step ST03 of FIG. 17).

When the user utters "Is there a restaurant near here?" in this situation, the voice acquirer 9 captures this voice "Is there a restaurant near here?" first, and A/D converts the voice by using, for example, PCM (step ST11 of FIG. 18). The voice recognizer 10 then performs the recognition process on the captured voice, and outputs "restaurant" as a recognition result (step ST12).

The display item generator 22 then generates an operation button showing restaurant as a display item corresponding to the recognition result "restaurant" (step ST13), and the display item drawer 25 outputs a command for displaying the generated operation button in the display area 41 which is determined and specified by the display item display form determinator 24 to the display 13 (step ST14).

As a result, the operation button 45 is displayed in the display area 41, as shown in FIG. 20(*b*).

When the vehicle 31 then travels forward and the display screen enters a state in which one facility icon 33 exists in the display area 41, as shown in FIG. 20(*c*), the display area degree of importance calculator 23 calculates the degree of importance of the display area 41 to be "10" because the single facility icon 33 exists in the display area 41 which is the display area of the display item (steps ST01 and ST02 of FIG. 17).

In this case, because the degree of importance of the display area 41 is equal to or less than the predetermined first threshold (25), the display item display form determinator 24 determines the display area 41 as the display area in which the display item is to be displayed, and outputs a command for specifying the display area to the display item drawer 25 (steps ST04 and ST06 when "YES" of step ST03 of FIG. 17).

The display item drawer 25 then checks that the display area specified by the display item display form determinator 24 is the display area 41, and outputs a command for displaying the display item in the display area 41 to the display 13 (steps ST21 and ST22 of FIG. 19).

When the vehicle 31 further travels forward, and the display screen enters a state in which three facility icons 33 exist in the display area 41, two facility icons 33 exist in the display area 42, no facility icon 33 exists in the display area 43, and one facility icon 33 exists in the display area 44, as shown in FIG. 20(*d*), the display area degree of importance calculator 23 calculates the degrees of importance of the display areas 41, 42, 43, and 44 to be "30", "20", "0", and "10", respectively (steps ST01 and ST02 of FIG. 17).

In this case, the display item display form determinator 24 determines the display area 43 whose degree of importance is equal or less than the first threshold and is the lowest as the display area in which the display item is to be displayed because the degree of importance of the display area 41 is greater than the predetermined first threshold (25), and outputs a command for specifying the display area to the display item drawer 25 (steps ST05 and ST06 when "NO" in step ST03 of FIG. 17).

At this time, because the specification by the command outputted from the display item display form determinator 24 is changed from the display area 41 to the display area 43, the display item drawer 25 outputs a command for displaying the operation button 45 in the display area 43 to the display 13 (steps ST21 and ST22 of FIG. 19).

As a result, as shown in FIG. 20(*d*), the operation button 45 is displayed in the display area 43.

FIG. 21(*a*) is the same display screen as FIG. 20(*d*).

When the user utters "I might go to a convenience store" in this situation, the processes of steps ST11 and ST12 of FIG. 18 are performed, and the voice recognizer 10 outputs "convenience store" as a recognition result.

The display item generator 22 then generates an operation button corresponding to the recognition result "convenience store" (step ST13), and the display item drawer 25 outputs a command for displaying the generated operation button in the display area 43 specified by the display item display form determinator 24 to the display 13 (step ST14).

As a result, as shown in FIG. 21(*b*), in addition to the operation button 45 displayed in the display area 43, the operation button 46 is displayed.

After that, when the vehicle 31 travels forward and the display screen enters a state in which no facility icon 33 exists in any one of the display areas 41 to 44, as shown in FIG. 21(*c*), the display area degree of importance calculator 23 calculates the degrees of importance of the display areas 41, 42, 43, and 44 to be "0", "0", "0", and "0", respectively, determines the display area 41 specified in advance as the display area in which the display items are to be displayed, and outputs a command for specifying the display area to the display item drawer 25.

At this time, because the specification by the command outputted from the display item display form determinator 24 is changed from the display area 43 to the display area 41, the display item drawer 25 outputs a command for displaying the operation buttons 45 and 46 in the display area 41 to the display 13 (steps ST21 and ST22 of FIG. 19).

As a result, as shown in FIG. 21(*d*), the operation buttons 45 and 46 are displayed in the display area 41.

Because the navigation device changes the display area of a display item according to the degree of importance of each of the display areas in this way, the navigation device prevents the acquisition of other information important for the user from being blocked due to the display of the display item, and improves the user's convenience.

When no display area is specified in advance by the system or the like, a display item can be displayed in a display area whose degree of importance is equal to or less than the first threshold and is the lowest.

Figure 22:
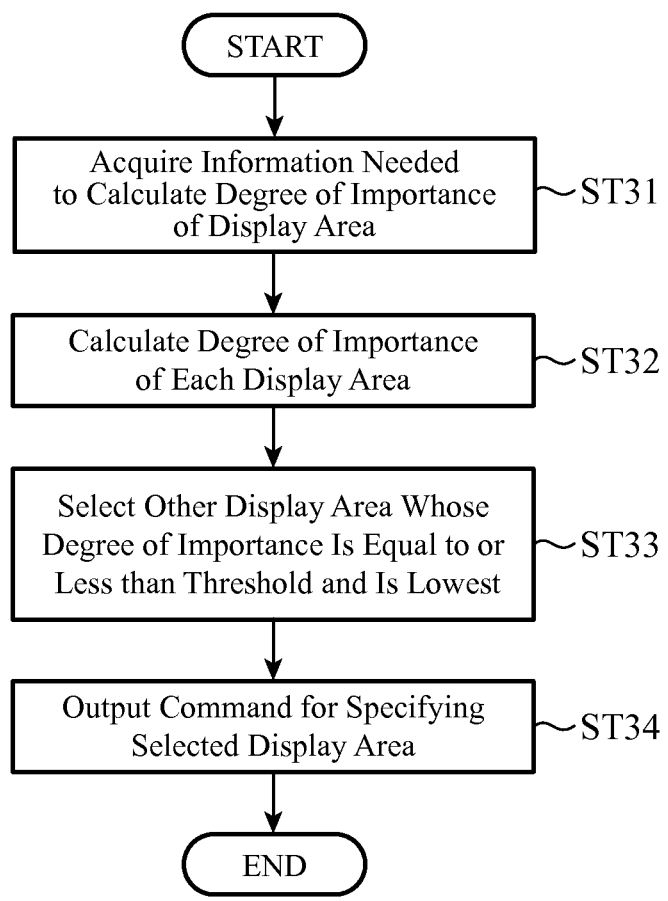
FIG. 22 is a flow chart showing a process of determining a display area in which a display item is to be displayed when no display area is specified in advance in Embodiment 1.

In this case, a flow chart showing the process of determining the display area in which a display item is to be displayed is as shown in FIG. 22.

FIG. 22 is a flowchart showing the process of determining the display area which a display item is to be displayed when no display area is specified in advance in this Embodiment 1.

Because the processes of steps ST31 and ST32 are the same as those of steps ST01 and ST02 of FIG. 17, the explanation of the processes will be omitted hereafter.

The display item display form determinator 24 determines a display area whose degree of display area importance is equal to or less than the first threshold and is the lowest as the display area in which a display item is to be displayed on the basis of the degree of importance of each of the display areas calculated by the display area degree of importance calculator 23 (step ST33). The display item display form determinator then outputs a command for specifying the determined display area to the display item drawer 25 (step ST34).

Figure 23:
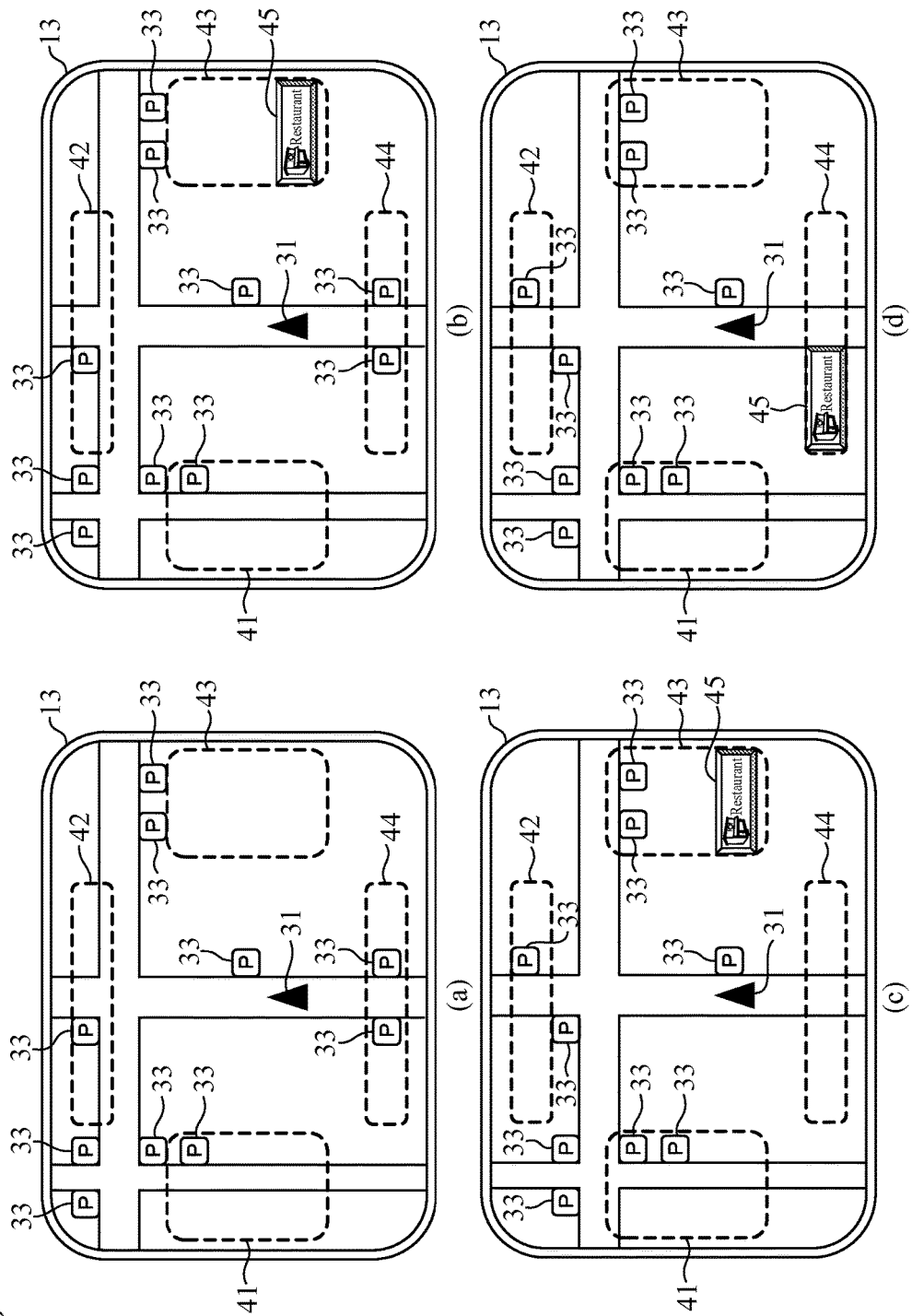
FIG. 23 is a diagram showing another example of a screen transition based on a relation between facility icons and a display item displayed in a display area in a state in which a map screen is displayed on the display.

Hereafter, an explanation will be made with reference to FIG. 23 by providing a concrete example. FIG. 23 is a diagram showing an example of a screen transition based on a relation between facility icons 33 and a display item displayed in a display area in a state in which a map screen is displayed on the display 13 when the processing is performed according to the flow chart of FIG. 22.

It is assumed that an item for which the degree of importance is determined, information needed to determine the degree of importance, and the predetermined first threshold for each of the display areas are the same as those used in the explanation of FIGS. 20 and 21. More specifically, it is assumed that the major item (2) mentioned above is selected as an item for which the degree of importance of each of the display areas is calculated, and a relation between the number of facility icons 33 and the degree of importance is as shown in FIG. 6. It is further assumed that the first threshold which is set to the display item display form determinator 24 and which is associated with the degree of importance of each of the display areas is "25."

First, the display area degree of importance calculator 23 acquires the information needed to determine the degree of importance (step ST31 of FIG. 22).

Next, the display area degree of importance calculator 23 calculates the degree of importance of each of the display areas in FIG. 23(*a*) (step ST32). In FIG. 23(*a*), one facility icon 33 exists in the display area 41, one facility icon 33 exists also in the display area 42, no facility icon 33 exists in the display area 43, and two facility icons 33 exist in the display area 44.

As a result, the degrees of importance of the display areas 41, 42, 43, and 44 are calculated to be "10", "10", "0", and "20", respectively. The display item display form determinator 24 then determines the display area 43 whose degree of importance is the lowest as the display area in which a display item is to be displayed (step ST33), and outputs a command for specifying the display area to the display item drawer 25 (step ST34).

Then, when the user utters "Is there a restaurant near here?" in this situation, an operation button 45 corresponding to "restaurant" is displayed in the display area 43, as shown in FIG. 23(*b*).

Next, when the vehicle 31 travels forward, and the display screen enters a state in which two facility icons 33 exist in the display area 41, one facility icon 33 exists in the display area 42, two facility icons exist in the display area 43, and no facility icon 33 exists in the display area 44, as shown in FIG. 23(*c*), the degrees of importance of the display areas 41, 42, 43, and 44 are calculated to be "20", "10", "20", and "00", respectively.

As a result, as shown in FIG. 23(d), the operation button 45 which had already been displayed in the display area 43 is displayed in the display area 44.

When the display area of the operation button 45 already displayed is changed, the operation button 45 can be moved immediately from the display area 43 to the display area 44 and displayed in this display area, like in the case of making a transition from FIG. 23(c) to FIG. 23(d), or the operation button 45 already displayed can be made to remain existing and when another operation button is then displayed, the operation button can be displayed in the display area 44 after the change.

Further, when the degrees of importance of all the display areas are greater than the predetermined first threshold (or equal to or greater than the first threshold), it is possible not to display the generated display item. In this case, the display item display form determinator 24 can determine that there is no display area in which the display item is to be displayed, and output a command indicating to that effect to the display item drawer 25, and when receiving this command, the display item drawer 25 can output a command for not displaying the display item to the display 13.

By doing in this way, the navigation device prevents the acquisition of other information important for the user from being blocked due to the display of the display item, and improves the user's convenience.

Further, when the degrees of importance of all the display areas are greater than the predetermined first threshold (or equal to or greater than the first threshold), the display items already displayed can be erased or display items can be erased until the degree of importance of the display area in which the display items are displayed becomes less than the first threshold. In this case, the display item display form determinator 24 can determine to erase the display items currently being displayed, or erase display items until the degree of importance of the display area in which the display items are displayed becomes less than the first threshold, and output a command indicating that the display items in the display area are to be erased to the display item drawer 25, and when receiving this command, the display item drawer 25 can output a command for erasing the display items to the display 13.

In addition, when the degree of importance of at least one of the display areas is equal to or less than the predetermined first threshold (or less than the first threshold), the erased display items can be displayed again in this display area.

"Erasing" mentioned in this specification, which is cited when, for example, erasing display items until the degree of importance of the display area in which the display items are displayed becomes equal to or less than the first threshold (or less than the first threshold) includes a case of, instead of completely erasing the display items currently being displayed, making the display items disappear in such a way that they simply seem to be erased temporarily as a result of displaying other important information (superimposed display), but actually exist on the screen.

By doing in this way, the navigation device prevents the acquisition of other information important for the user from being blocked due to the display of the display item, and improves the user's convenience.

Further, after determining or changing the display area in which a display item is to be displayed, the display item display form determinator can prevent itself from changing the display area (from outputting a specification command to the display 13) until a predetermined time has elapsed. In this case, when the display area specified by the display item display form determinator 24 differs from that at the time of the previous check in the flow chart of FIG. 19, the display item drawer 25 can determine whether the predetermined time has elapsed since the previous check, and when the predetermined time has not elapsed, output no command to the display 13, whereas when the predetermined time has elapsed, output a command for displaying the display item in the display area after the change to the display 13.

By doing in this way, the navigation device can reduce the user's confusion resulting from frequent changes of the display position of the display item.

As mentioned above, because the navigation device in accordance with this Embodiment 1 can change the position where a display item is displayed according to the degree of importance of a display area in which a display item corresponding to a voice recognition result is displayed, the navigation device can prevent the acquisition of other information important for the user from being blocked due to the display of the display item, and improve the user's convenience.

The controller 1, the traffic information transmitter and receiver 3, the route determining unit 6, the route guidance unit 7, the voice acquirer 9, the voice recognizer 10, the display controller 12, and the voice controller 14 can be implemented as concrete units in each of which hardware and software operate in cooperation with each other by the execution of a program associated with the processing specific to the present invention by a microcomputer of the navigation device to which the voice recognition device is applied. The same goes for the following embodiments.

Embodiment 2

Because a block diagram showing an example of a navigation device to which a voice recognition device in accordance with Embodiment 2 of the present invention is applied is the same as that of FIG. 1 shown in Embodiment 1, the illustration and explanation of the navigation device will be omitted hereafter. In Embodiment 2 shown hereafter, the voice recognition device differs from that in accordance with Embodiment 1 in that a display item display form determinator 24 determines the display form of a display item according to the degree of importance of each of display areas, and outputs a specification command to a display item drawer 25.

More specifically, the display item display form determinator 24 in accordance with this Embodiment 2 determines not only the display area in which a display item is to be displayed but also the display form of the display item. Although an explanation is made in this Embodiment 2 by assuming that the display item display form determinator 24 determines the display area, like that in accordance with Embodiment 1, and also determines the display form of the display item, the display area can be determined fixedly and the display item display form determinator 24 can determine only the display form.

In this embodiment, the display form of a display item shows a difference in its appearance presented to the user at the time of displaying the display item in a display area, such as the degree of transparency of the display item, the size of the display item, the display time in the display area of the display item, the largest display number of display items displayable in the display area, or the amount of information of the display item.

Figure 24:
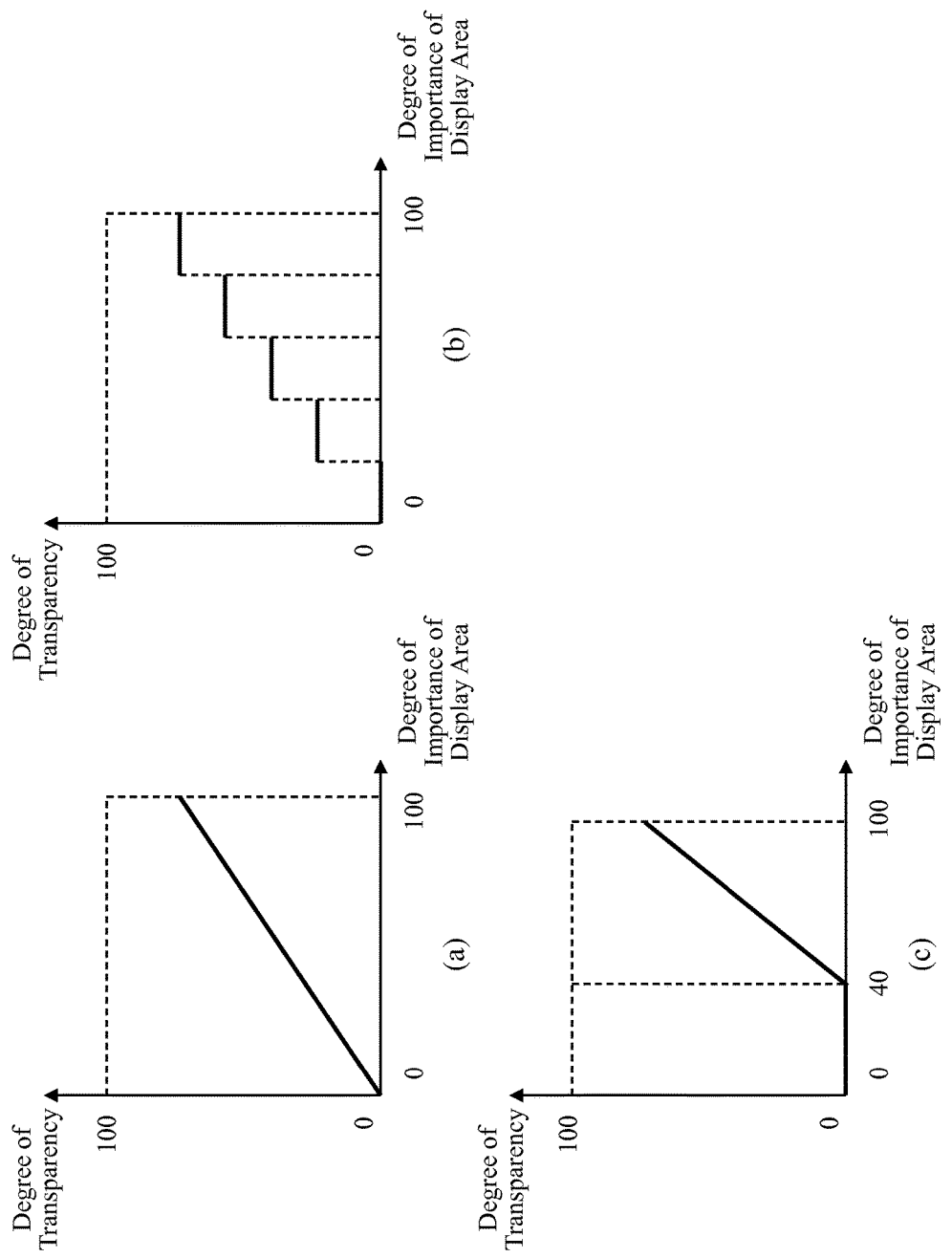
FIG. 24 is a diagram showing an example of a relation between the degree of importance of a display area and the degree of transparency of a display item.

FIG. 24 is a diagram showing an example of a relation between the degree of importance of a display area, and the degree of transparency of a display item.

In the example of FIG. 24(a), the higher the degree of importance of a display area, the higher the degree of transparency of a display item displayed in the display area. More specifically, the degree of importance and the degree of transparency have a positive correlation.

As an alternative, as shown in FIG. 24(b), the degree of transparency of a display item can be made to increase step by step according to the degree of importance of a display area.

Further, as shown in FIG. 24(c), when the degree of importance of a display area is equal to or less than a predetermined threshold (a threshold for display form determination, which is referred to as "a second threshold") (e.g., 40) (or when the degree of importance of a display area is less than the second threshold), the degree of transparency of a display item can be set to a fixed value, whereas when the degree of importance of a display area is greater than the second threshold (or equal to or greater than the second threshold), the degree of transparency of a display item can be made to increase according to the degree of importance.

Figure 25:
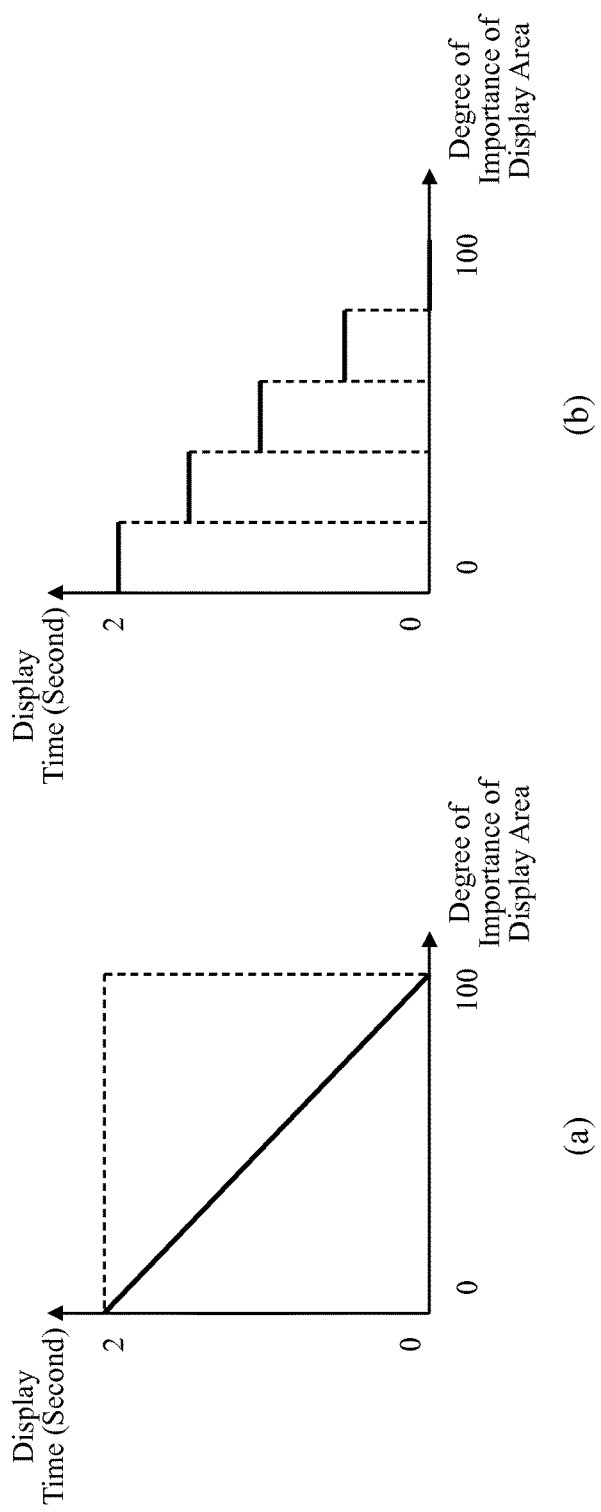
FIG. 25 is a diagram showing an example of a relation between the degree of importance of a display area and the display time of a display item.

FIG. 25 is a diagram showing an example of a relation between the degree of importance of a display area, and the display time of a display item.

In the example of FIG. 25(a), the higher the degree of importance of a display area, the shorter the display time of a display item displayed in the display area. More specifically, the degree of importance and the display time have a negative correlation.

As an alternative, as shown in FIG. 25(b), the display time of a display item can be made to decrease step by step according to the degree of importance of a display area.

It is assumed that the size of a display item and the largest display number of display items also have a negative correlation with the degree of importance, like the display time of a display item. More specifically, the size of a display item displayed in a display area can be decreased or decreased step by step with increase in the degree of importance of the display area, and the largest display number of display items displayable in the display area can be decreased or decreased step by step with increase in the degree of importance of the display area.

Figure 26:
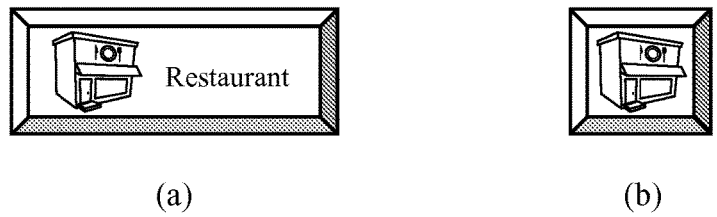
FIG. 26 is a diagram showing an example of change of the amount of information of a display item.

FIG. 26 is a diagram showing an example of a change in the amount of information of a display item. When the degree of importance of a display area is greater than the predetermined second threshold (or equal to or greater than the second threshold), the display item display form determinator 24 outputs a command for, for example, changing a display item which consists of an icon and a character string as shown in FIG. 26(a) to a display item which consists of only an icon as shown in FIG. 26(b).

The display item drawer 25 then changes the display form of the display item into a display form (a degree of transparency, a size, a display time, a largest display number, an amount of information, or the like) which is determined and specified by the display item display form determinator 24, and outputs a command for displaying the display item in the display area specified by the display item display form determinator 24 to a display 13.

Further, in a case in which the display time (e.g., 2 seconds) is specified as the display form of a display item, when the period of time during which the display item is displayed in the display 13 becomes longer than the display time specified by the display item display form determinator 24 (or equal to or longer than the specified display time), the display item drawer 25 outputs a command for erasing the display item to the display 13.

Further, in a case in which the largest display number (e.g., four) is specified as the display form of a display item, when the number of display items currently being displayed in the display 13 becomes larger than the largest display number specified by the display item display form determinator 24 (or equal to or larger than the largest display number specified), the display item drawer 25 erases a display item which has been displayed for the longest period of time, and outputs a command for displaying a newly generated display item to the display 13.

Next, processing performed by the navigation device in accordance with Embodiment 2 will be explained by using flow charts shown in FIGS. 27 to 29. Hereafter, the explanation will be made by providing, as an example, a case of changing the degree of transparency of a display item according to the degree of importance of a display area.

Figure 27:
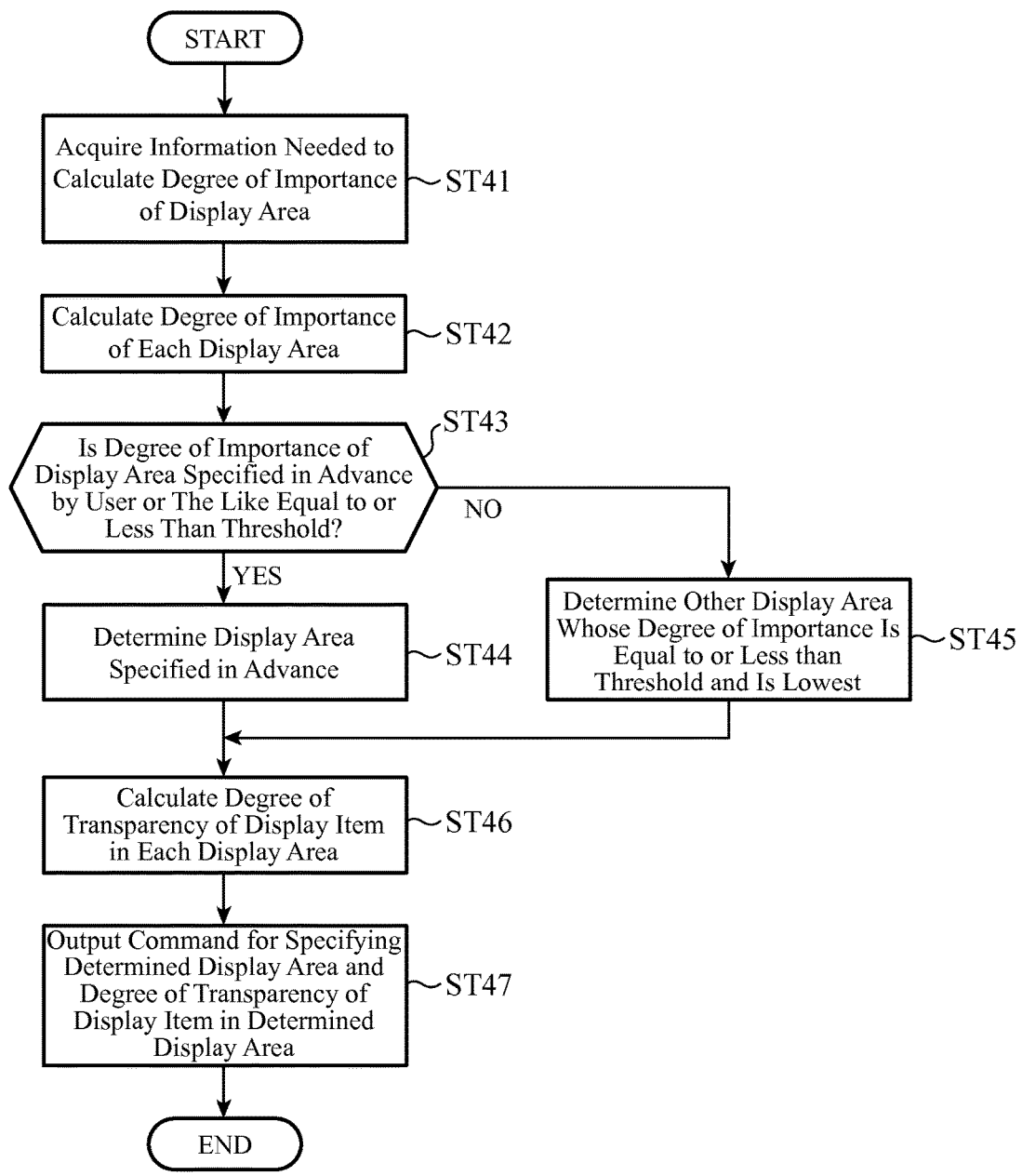
FIG. 27 is a flow chart showing a process of determining a display area in which a display item is to be displayed, and determining the degree of transparency of the display item in Embodiment 2.

FIG. 27 is a flow chart showing a process of determining the display area in which a display item is to be displayed, and determining the degree of transparency in this Embodiment 2.

Because processes of steps ST41 to ST45 are the same as those of steps ST01 to ST05 of FIG. 17, the explanation of the processes will be omitted hereafter.

The display item display form determinator 24 calculates the degree of transparency corresponding to the degree of importance of the determined display area according to the relation between the degree of importance and the degree of transparency which is shown in, for example, FIG. 24(a) (step ST46). The display item display form determinator outputs a command for specifying both the determined display area and the degree of transparency in the display area to the display item drawer 25 (step ST47).

Figure 28:
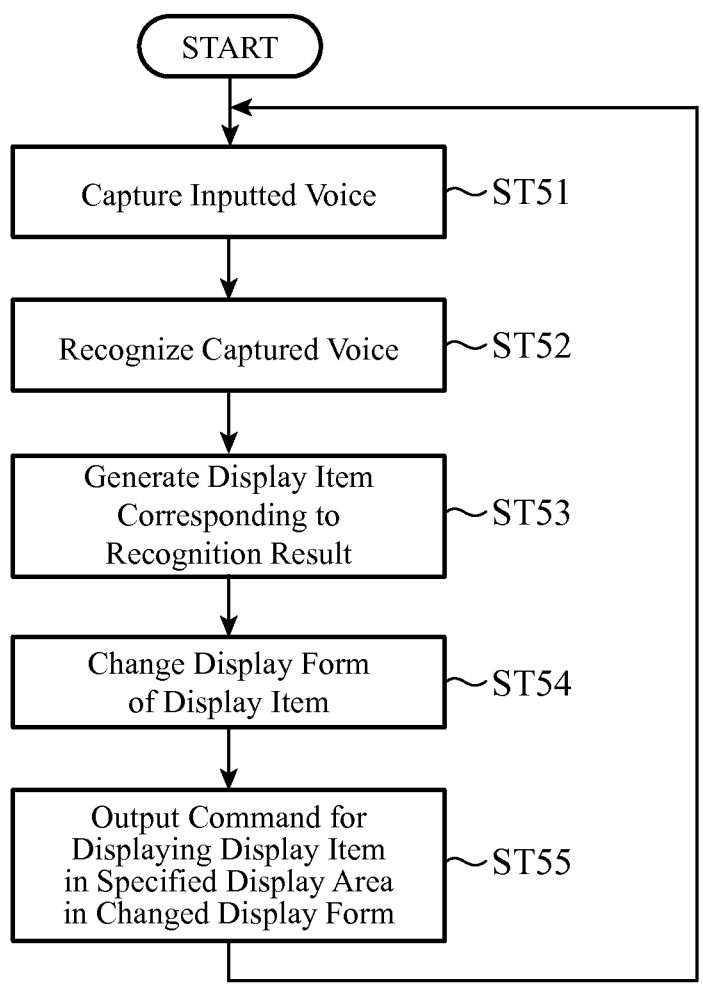
FIG. 28 is a flow chart showing a process of generating and displaying a display item in Embodiment 2.

FIG. 28 is a flow chart showing a process of generating and displaying a display item in this Embodiment 2.

Because processes of steps ST51 to ST55 are the same as those of steps ST11 to ST13 of FIG. 18, the explanation of the processes will be omitted hereafter.

The display item drawer 25 changes the degree of transparency of a display item generated by the display item generator 22 to the degree of transparency which is determined by the display item display form determinator 24 and for which a specification command is outputted by the display item display form determinator (step ST54). The display item drawer outputs a command for displaying the display item having the changed degree of transparency in the display area which is specified by the display item display form determinator 24 to the display 13 (step ST55).

Figure 29:
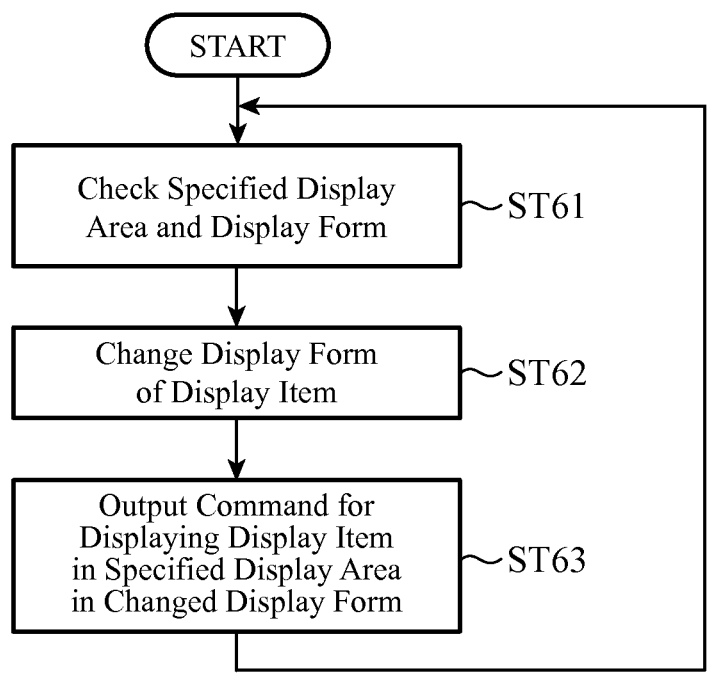
FIG. 29 is a flow chart showing a process of changing the display area of a display item already displayed on the display and changing the degree of transparency of the display item in Embodiment 2.

FIG. 29 is a flow chart showing a process of changing the display area of a display item already displayed on the display 13, and changing the degree of transparency in this Embodiment 2.

The display item drawer 25 checks the display area and the degree of transparency which are determined and specified by the display item display form determinator 24 (step ST61).

Then, after changing the degree of transparency of a display item already displayed to the specified degree of transparency (step ST62), the display item drawer 25 outputs a command for displaying the display item having the changed degree of transparency in the specified display area to the display 13 (step ST63).

Until a predetermined time has elapsed after the change of the display form of the display item, the display item drawer can prevent itself from changing the display form (from outputting a specification command to the display 13).

By doing in this way, the navigation device can reduce the user's confusion resulting from frequent changes of the display form of a display item.

As mentioned above, because even in a case in which information important for the user is hidden by a display item corresponding to a voice recognition result, the navigation device in accordance with this Embodiment 2 can change the display form of the display item according to the degree of importance of the display area in which the display item is displayed, the navigation device can prevent the acquisition of other information important for the user from being blocked due to the display of the display item, and can improve the user's convenience.

Embodiment 3

Although the voice recognition device in accordance with the present invention is explained in above-mentioned Embodiments 1 and 2 by providing, as an example, the case of applying the voice recognition device to a navigation device mounted in a moving object, such as a vehicle, the voice recognition device can be applied to not only a navigation device for vehicles, but also to a navigation device for moving objects including persons, vehicles, railroads, ships, or airplanes and to a server of a voice recognition system and a server of a navigation system. Further, the voice recognition device can be applied to a system in any form, such as an application for a voice recognition system, an application for a navigation system, etc. which are installed in mobile information terminals, such as smart phones, tablet PCs, and mobile phones.

Figure 30:
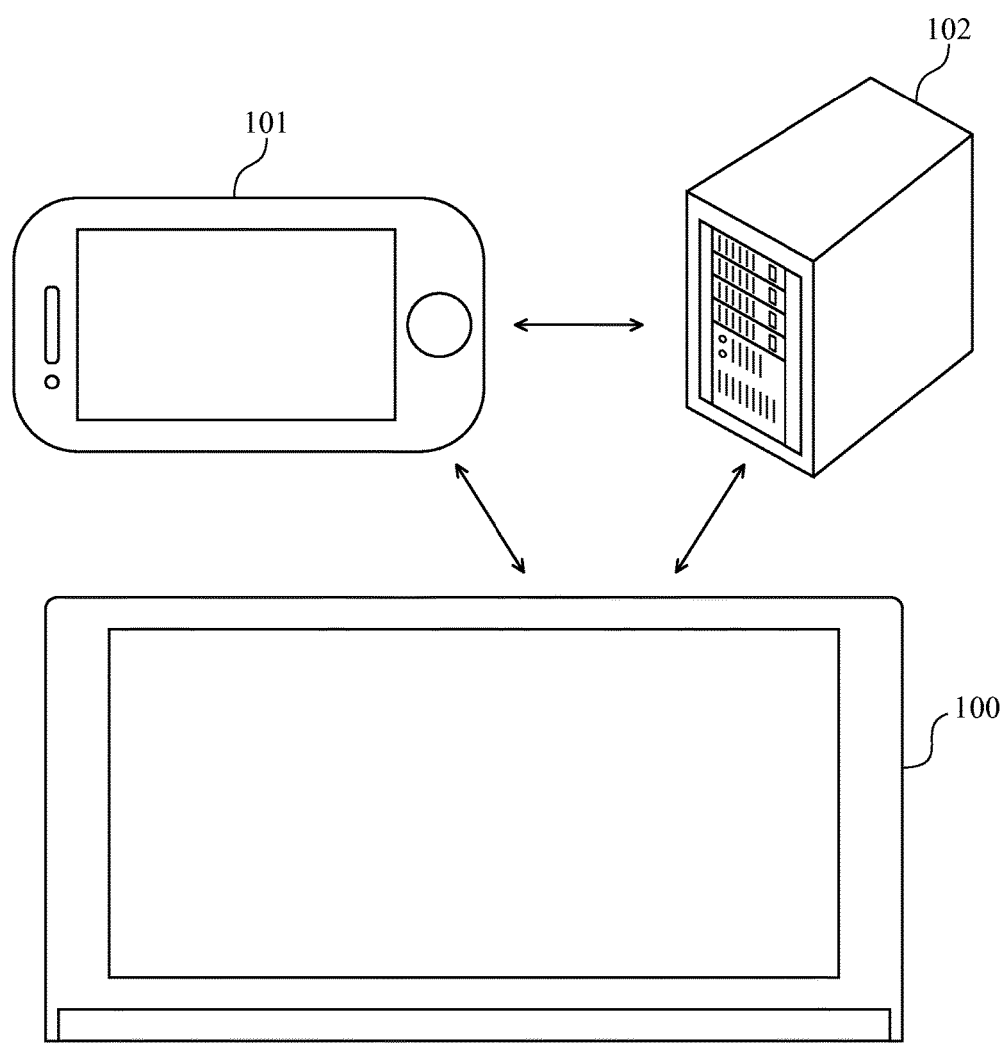
FIG. 30 is a diagram showing an outline of a navigation system in accordance with Embodiment 3.

FIG. 30 is a diagram showing an outline of a navigation system in accordance with Embodiment 3 of the present invention. This navigation system can have one of various forms including a form in which a vehicle-mounted unit 100 performs a voice recognition process and a navigation process in cooperation with at least one of a mobile information terminal 101, such as a smart phone, and a server 102, and a form in which at least one of the mobile information terminal 101, such as a smart phone, and the server 102 performs a voice recognition process and a navigation process, and causes the vehicle-mounted unit 100 to display a recognition result and map information. Hereafter, the configuration of the navigation system will be explained.

Although it is explained in Embodiments 1 and 2 that the vehicle-mounted unit 100 shown in FIG. 30 has all of the functions of the voice recognition device in accordance with the present invention, a case in which the server 102 performs a voice recognition process, and provides a recognition result for the user by causing the vehicle-mounted unit 100 to display a display item corresponding to the recognition result in the navigation system in accordance with this Embodiment 3, and a case in which the mobile information terminal 101 performs a voice recognition process in cooperation with the server 102, and provides a recognition result for the user by causing the vehicle-mounted unit 100 to display a display item corresponding to the recognition result in the navigation system will be explained hereafter.

First, the case in which the server 102 performs a voice recognition process and causes the vehicle-mounted unit 100 to display a display item corresponding to a recognition result, i.e., a case in which the vehicle-mounted unit 100 functions as a display device in cooperation with the server 102 having a voice recognition function will be explained.

In this configuration, there can be considered a case in which the vehicle-mounted unit 100 communicates directly with the server 102, or the vehicle-mounted unit 100 communicates with the server 102 via the mobile information terminal 101. The server 102 functions as a voice recognition device provided with a voice recognizer and a display controller which are explained in above-mentioned Embodiments 1 and 2. Further, the vehicle-mounted unit 100 functions as a display device provided with at least a display 13 for providing the user with a display item corresponding to a recognition result provided by the server 102.

In this case, the vehicle-mounted unit 100 has only a communication function and a display function basically, receives the display item (including information about a display area and a display form) corresponding to the voice recognition result provided by the server 102, and provides the user with the display item.

More specifically, the server 102 is a voice recognition device having components other than a microphone 8, a voice acquirer 9, a command input unit 11, the display 13, and a speaker 15, and the server 102 which is this voice recognition device recognizes a voice uttered by the user and causes the vehicle-mounted unit 100 which is a display device to display a display item corresponding to a recognition result.

Even though the navigation system is configured in this way, the navigation system can provide the same advantages as those provided by any one of Embodiments 1 and 2.

Further, a case in which the mobile information terminal 101 performs a voice recognition process in cooperation with the server 102 and the vehicle-mounted unit 100 provides the user with display items corresponding to a recognition result will be explained.

In this configuration, there can be considered a case in which the vehicle-mounted unit 100 communicates with the server 102 via the mobile information terminal 101, and an application for the mobile information terminal 101 performs a voice recognition process in cooperation with the server 102. Further, the vehicle-mounted unit 100 functions as a display device provided with at least a display 13 for providing the user with a display item corresponding to a recognition result provided by the mobile information terminal 101 and the server 102.

Also in this case, the vehicle-mounted unit 100 has only a communication function and a display function basically, receives the display item (including information about a display area and a display form) corresponding to the voice recognition result which is provided by the mobile information terminal 101 and the server 102 in cooperation with each other, and provides the user with the display item.

More specifically, by using an application for the mobile information terminal 101, the navigation system causes the vehicle-mounted unit 100 which is the display device to display a display item corresponding to a recognition result which is acquired by recognizing a voice uttered by the user.

Even though the navigation system is configured in this way, the navigation system can provide the same advantages as those provided by any one of Embodiments 1 and 2.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

The voice recognition device in accordance with the present invention can be applied to a navigation device mounted in a moving object, such as a vehicle, a server for a vehicle-mounted information providing system, an application for a navigation system installed in mobile information terminals, such as smart phones, tablet PCs, and mobile phones, etc., and so on.

EXPLANATIONS OF REFERENCE NUMERALS

1 controller, 2 current position detector, 3 traffic information transmitter and receiver, 4 map information storage, 5 map information acquirer, 6 route determining unit, 7 route guidance unit, 8 microphone, 9 voice acquirer, 10 voice recognizer, 11 command input unit, 12 display controller, 13 display, 14 voice controller, 15 speaker, 16 traveling condition acquirer, 17 surrounding environmental condition acquirer, 21 map drawing unit, 22 display item generator, 23 display area degree of importance calculator, 24 display item display form determinator, 25 display item drawer, 31 vehicle, 32 display of congestion information, 33 facility icon, 34 guidance information, 35 warning information, 36 another display item (button for making a transition to another screen), 40, 41, 42, 43, and 44 display area of display item 40, 45 and 46 display item of recognition result (operation button), 100 vehicle-mounted unit, 101 mobile information terminal, 102 server.

The invention claimed is:

1. A voice recognition device that recognizes a voice uttered by a user, and displays an operation button to which a function corresponding to a recognition result is assigned, said voice recognition device comprising:
a display having a plurality of predefined display areas;
a voice input that acquires and digitizes a voice uttered by said user;
at least one controller configured to
receive a voice recognition result from a voice recognizer that recognizes acquired voice data and outputs a recognition result;
generate an operation button corresponding to said voice recognition result;
calculate a degree of importance of each of the plurality of predefined display areas in said display;
select at least one of the plurality of predefined display areas in which the generated operation button is to be displayed and determine a display form of said operation button on a basis of the calculated degree of importance for each of the plurality of predefined display areas; and
output, to said display, a command for displaying said generated operation button on a basis of the selected predefined display area or the determined display form, wherein
when the calculated degree of importance of a predefined display area corresponding to a display area specified in advance from said plurality of predefined display areas is equal to or less than a predetermined threshold, said controller selects said predefined display area corresponding to the display area specified in advance as the predefined display area in which said operation button is to be displayed, whereas when the calculated degree of importance of said predefined display area corresponding to the display area specified in advance is greater than said predetermined threshold, the controller selects another one of the plurality of predefined display areas as the predefined display area in which said generated operation button is to be displayed,
a navigation device, connected to the voice recognition device, displays a map on said display and provides route guidance for a moving object, and
the at least one controller is configured to calculate the degree of importance based on a positional relationship between a traveling direction or a planned traveling direction of said moving object displayed on said display and said predefined display areas, such that the degree of importance increases for a predefined area, among said plurality of predefined display areas, located in a traveling direction or a planned traveling direction of said moving object.

2. The voice recognition device according to claim 1, wherein said controller selects the predefined display area whose calculated degree of importance is lowest as the predefined display area in which said operation button is to be displayed.

3. The voice recognition device according to claim 1, wherein when the calculated degree of importance of said predefined display area corresponding to the display area specified in advance is greater than said predetermined threshold, the controller selects the predefined display area whose calculated degree of importance is equal to or less than the predetermined threshold and is lowest as the predefined display area in which said operation button is to be displayed.

4. The voice recognition device according to claim 1, wherein when the calculated degree of importance of said predefined display area corresponding to the display area specified in advance is greater than said predetermined threshold and there are a plurality of other predefined display areas having the same calculated degree of importance, the controller either selects a predefined display area at random or selects a predefined display area having a highest calculated priority according to predetermined priorities as the predefined display area in which said operation button is to be displayed.

5. The voice recognition device according to claim 1, wherein when the calculated degrees of importance of all of said plurality of display areas are greater than the predetermined threshold, said controller determines that there is no predefined display area in which said operation button is to be displayed, and outputs a command for not displaying said operation button to said display.

6. The voice recognition device according to claim 1, wherein when the calculated degrees of importance of all of said plurality of display areas are greater than the predetermined threshold, said controller
determines operation buttons currently being displayed in one or more of said plurality of predefined display areas should be erased and
outputs a command for erasing said operation buttons to said display.

7. The voice recognition device according to claim 1, wherein after outputting a command for displaying said operation button on a basis of at least one of the display area and the display form which is determined by said controller to said display, said controller does not output any command to said display until a predetermined time has elapsed.

8. The voice recognition device according to claim 1, wherein said controller determines a size of said operation button according to the calculated degree of importance of the predefined display area selected for display of said operation button.

9. The voice recognition device according to claim 1, wherein said controller determines a largest display number of said operation button displayed in said predefined display area according to the calculated degree of importance of the predefined display area in which said operation button is displayed.

10. The voice recognition device according to claim 1, wherein said controller determines a degree of transparency of said operation button according to the calculated degree of importance of the predefined display area in which said operation button is displayed.

11. The voice recognition device according to claim 1, wherein said controller determines an amount of information of said operation button according to the calculated degree of importance of the predefined display area in which said operation button is displayed.

12. The voice recognition device according to claim 1, wherein said controller determines a display time of said operation button in the predefined display area according to the calculated degree of importance of said predefined display area in which said operation button is displayed.

13. The voice recognition device according to claim 1, wherein when the calculated degree of importance of the selected predefined display area is greater than the predetermined threshold, said controller determines the display form of said operation button according to said calculated degree of importance.

14. The voice recognition device according to claim 1, wherein said controller further calculates said degree of importance on a basis of a display state of traffic information on said map in said predefined display areas.

15. The voice recognition device according to claim 1, wherein said controller further calculates said degree of importance on a basis of a display state of icons on said map in said predefined display areas.

16. The voice recognition device according to claim 1, wherein said controller further calculates said degree of importance on a basis of a display state of guidance information/warning information in said predefined display areas.

17. The voice recognition device according to claim 1, wherein said controller further calculates said degree of importance on a basis of either a traveling condition of said moving object or a surrounding environmental condition of said moving object.

18. The voice recognition device according to claim 1, wherein said controller further calculates said degree of importance on a basis of another operation button currently being displayed in said display area.

19. The voice recognition device according to claim 1, wherein said voice recognizer recognizes the voice data acquired by said voice input and outputs the recognition result at all times, even if a voice recognition process start command is not provided by a user.

20. A voice recognition device that recognizes a voice uttered by a user, and displays an operation button to which a function corresponding to a recognition result is assigned on a display device having a plurality of predefined display areas, said voice recognition device comprising:
a voice input that acquires and digitizes a voice uttered by said user; and
at least one controller configured to receive a voice recognition result from a voice recognizer that recognizes acquired voice data and outputs a recognition result;
generate an operation button corresponding to said voice recognition result;
calculate a degree of importance of each of the plurality of predefined display areas in said display device;
select at least one of the plurality of predefined display areas in which the generated operation button is to be displayed and determine a display form of said generated operation button on a basis of the calculated degree of importance; and
output a command to said display device for displaying said generated operation button on a basis of the selected predefined display area or the determined display form, wherein
when the calculated degree of importance of a predefined display area corresponding to a display area specified in advance from said plurality of predefined display areas is equal to or less than a predetermined threshold, said controller selects said predefined display area corresponding to the display area specified in advance as the predefined display area in which said operation button is to be displayed, whereas when the calculated degree of importance of said predefined display area corresponding to the display area specified in advance is greater than said predetermined threshold, the controller selects another one of the plurality of predefined display areas as the predefined display area in which said operation button is to be displayed,
a navigation device, connected to the voice recognition device, displays a map on said display and provides route guidance for a moving object, and
the at least one controller is configured to calculate the degree of importance based on a positional relationship between a traveling direction or a planned traveling direction of said moving object displayed on said display and said predefined display areas, such that the degree of importance increases for a predefined area, among said plurality of predefined display areas, located in a traveling direction or a planned traveling direction of said moving object.

21. A display method of recognizing a voice uttered by a user, and displaying an operation button to which a function corresponding to a recognition result is assigned on a display device having a plurality of predefined display areas, which a voice recognition device uses, said display method comprising:
detecting and acquiring a voice uttered by said user;
recognizing voice data acquired and outputting a recognition result;
generating an operation button corresponding to said recognition result outputted;
calculating a degree of importance of each of the plurality of predefined display areas in said display device;
determining at least one of a display area in which the operation button generated is to be displayed and a display form of said operation button on a basis of the calculated degree of importance; and
outputting a command for displaying said generated operation button on a basis of the determined display area or the determined display form, wherein
when the calculated degree of importance of a predefined display area corresponding to a display area specified in advance from said plurality of predefined display areas is equal to or less than a predetermined threshold, said predefined display area corresponding to the display area specified in advance is selected as the predefined display area in which said generated operation button is to be displayed, whereas when the calculated degree of importance of said predefined display area corresponding to the display area specified in advance is greater than said predetermined threshold, another one of the plurality of predefined display areas is selected as the predefined display area in which said generated operation button is to be displayed, a navigation device displays a map on said display device and provides route guidance for a moving object, and the degree of importance is calculated based on a positional relationship between a traveling direction or a planned traveling direction of said moving object displayed on said display device and said predefined display areas, such that the degree of importance increases for a predefined area, among said plurality of predefined display areas, located in a traveling direction or a planned traveling direction of said moving object.

* * * * *